United States Patent
Kawaguchi

(10) Patent No.: US 9,189,335 B2
(45) Date of Patent: *Nov. 17, 2015

(54) FAST DATA RECOVERY FROM HDD FAILURE

(71) Applicant: Hitachi, Ltd., Tokyo (JP)

(72) Inventor: Tomohiro Kawaguchi, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,940

(22) Filed: Dec. 24, 2013

(65) Prior Publication Data

US 2014/0115384 A1   Apr. 24, 2014

Related U.S. Application Data

(63) Continuation of application No. 13/544,417, filed on Jul. 9, 2012, now Pat. No. 8,639,969, which is a continuation of application No. 13/018,821, filed on Feb. 1, 2011, now Pat. No. 8,234,519, which is a continuation of application No. 12/257,487, filed on Oct. 24, 2008, now Pat. No. 7,904,749.

(51) Int. Cl.
  *G06F 11/00*  (2006.01)
  *G06F 11/10*  (2006.01)

(52) U.S. Cl.
  CPC ........ *G06F 11/1076* (2013.01); *G06F 11/1092* (2013.01)

(58) Field of Classification Search
  CPC .................................................. G06F 11/1076
  USPC .......................................... 714/6.1, 6.24, 6.23
  See application file for complete search history.

(56) References Cited

U.S. PATENT DOCUMENTS

| | | | |
|---|---|---|---|
| 4,092,732 A | 5/1978 | Ouchi | |
| 5,608,891 A | 3/1997 | Mizuno et al. | |
| 6,105,122 A | 8/2000 | Muller et al. | |
| 6,665,743 B2 | 12/2003 | Benhase et al. | |
| 6,775,791 B2 | 8/2004 | McAfee | |
| 6,934,904 B2 | 8/2005 | Talagala et al. | |
| 7,032,093 B1 | 4/2006 | Cameron | |
| 7,100,089 B1 | 8/2006 | Phelps | |
| 7,162,600 B2 | 1/2007 | Kano et al. | |
| 7,191,304 B1 | 3/2007 | Cameron et al. | |

(Continued)

OTHER PUBLICATIONS

J. Menon et al., Distributed Sparing in Disk Arrays, IEEE, 1992, 12 pp., CA, USA.

(Continued)

*Primary Examiner* — Dieu-Minh Le
(74) *Attorney, Agent, or Firm* — Mattingly & Malur, PC

(57) ABSTRACT

A storage system comprises a first storage device having a first plurality of hard disk drives and a first controller. The first controller stores data in the first plurality of hard disk drives by stripes. Each stripe includes M data and N parity data allocated to M+N hard disk drives of the first plurality of hard disk drives. A first hard disk drive includes data or parity data of both a first stripe of the stripes and a second stripe of the stripes, while a second hard disk drive includes data or parity data of only one of the first stripe or the second stripe. During data recovery involving failure of one of the first plurality of hard disk drives, the data in the failed hard disk drive is recovered for each stripe by calculation using data and parity data in other hard disk drives for each stripe.

14 Claims, 41 Drawing Sheets

(56) References Cited

U.S. PATENT DOCUMENTS

| | | |
|---|---|---|
| 7,444,489 B2 | 10/2008 | Thomas et al. |
| 7,502,903 B2 | 3/2009 | Thomas et al. |
| 7,904,749 B2 * | 3/2011 | Kawaguchi .................... 714/6.1 |
| 8,099,623 B1 | 1/2012 | Li et al. |
| 8,234,519 B2 * | 7/2012 | Kawaguchi .................... 714/6.1 |
| 8,639,969 B2 * | 1/2014 | Kawaguchi .................... 714/6.1 |
| 2002/0104037 A1 | 8/2002 | McAfee |
| 2003/0074527 A1 | 4/2003 | Burton et al. |
| 2003/0167439 A1 | 9/2003 | Talagala et al. |
| 2006/0085674 A1 | 4/2006 | Ananthamurthy |
| 2008/0168304 A1 | 7/2008 | Flynn et al. |

OTHER PUBLICATIONS

S. W. NG et al., Uniform Parity Group Distribution in Disk Arrays with Multiple Failures, IEEE Transactions on Computers, Apr. 1994, 6 pp., vol. 43, No. 4.

J. Chandy et al., Failure Evaluation of Disk Array Organizations, IEEE, 1993, 8 pp., CA, USA.

RAID, XP-002636108, http://de.wikipedia.org/w/index.php?title=RAID&oldid=51975727, Oct. 18, 2008, 23 pp.

Datei: RAID 5EE.png, http://de.wikipedia.org/wiki/Datei:RAID_5EE.png, Feb. 23, 2006, 2 pp.

J. Menon et al., Comparison of Sparing Alternatives for Disk Arrays, May 1992, 12 pp., vol. 20, No. 2.

Q. Xin et al., Evaluation of Distributed Recovery in Large-Scale Storage Systems, Proceedings of the 13th IEEE International Symposium on High Performance Distributed Computing, Honolulu, HI, Jun. 2004, 10 pp., IEEE, USA.

* cited by examiner

| RAID Gr. # | RAID Lv. | HDD# | Capacity | Free Chunk Queue Index | Used Chunk Queue Index |
|---|---|---|---|---|---|
| 0 | 5x2 | 0-3, 4-7 | 1200[GB] | 1 | 8 |
| 1 | 5x2 | 8-11, 12-15 | 1200[GB] | 7 | 15 |
| 2 | 5x2 | 16-19, 20-23 | 1200[GB] | 2 | 3 |
| 3 | N/A | N/A | 0[GB] | NULL | NULL |
| 4 | N/A | N/A | 0[GB] | NULL | NULL |
| 5 | N/A | N/A | 0[GB] | NULL | NULL |
| 6 | 5x4 | 64-67, 68-71, 72-75, 76-79 | 2400[GB] | 31 | 22 |
| 7 | 5x4 | 80-83, 84-87, 88-91, 92-95 | 2400[GB] | 14 | 8 |

| 112-11-1-1 | 112-11-1-2 | 112-11-1-3 | 112-11-1-4 | 112-11-1-5 | 112-11-1-6 |

RAID Group Management Table

FIG. 4

| Vol# | Capacity | RAID Gr. # | Chunk# |
|---|---|---|---|
| 0 | 100[GB] | 1 | 23 |
| 1 | 300[GB] | 0 | 11 |
| 2 | 200[GB] | 1 | 71 |
| 3 | 600[GB] | 7 | 3 |
| 4 | N/A | N/A | N/A |
| 5 | 600[GB] | 2 | 1 |
| 6 | N/A | N/A | N/A |
| 7 | N/A | N/A | N/A |

Virtual Volume Management Table

FIG. 5

| Top LBA Addr. of Virtual Vol. Page (112-15-1-1) | RAID Gr. # (112-15-1-2) | Top LBA Addr. of Capacity Pool Page (112-15-1-3) |
|---|---|---|
| 0x0000 | 10 | 0x4000 |
| 0x0100 | 14 | 0x0200 |
| 0x0200 | 18 | 0x0000 |
| 0x0300 | N/A | N/A |
| 0x0400 | 10 | 0x3200 |
| 0x0500 | 18 | 0x0200 |
| 0x0600 | 10 | 0x1000 |

Virtual Volume Page Management Table 112-15-1

FIG. 6

| 112-15-2-1 | 112-15-2-2 | 112-15-2-3 | 112-15-2-4 | 112-15-2-5 | 112-15-2-6 |
|---|---|---|---|---|---|
| Capacity Pool Chunk# | Virtual Volume# | Used Capacity | Deleted Capacity | Previous Chunk Pointer | Next Chunk Pointer |
| 0 | 2 | 0 | 0kB | 7 | 2 |
| 1 | 10 | 2048kB | 1024kB | 2 | 3 |
| 2 | 5 | 8192kB | 768kB | 0 | 1 |
| 3 | 7 | 4096kB | 0kB | 1 | Null |
| 4 | N/A | 0 | 0 | 21 | 31 |

Capacity Pool Chunk Management Table 112-15-2

FIG. 7

| Capacity Pool Page Index | Virtual Volume Page# |
|---|---|
| 0 | 10 |
| 1 | 27 |
| 2 | NULL |
| 3 | 13 |

112-15-3-1  112-15-3-2

112-15-3

Capacity Pool Page Management Table

FIG. 8

Cache Management Table 112-14

| Index 112-14-1 | Virtual Volume# 112-14-2 | LBA 112-14-3 | Next 112-14-4 |
|---|---|---|---|
| 0 | 2 | 0xA00 | 1 |
| 1 | 1 | 0x7E000 | 2 |
| 2 | 1 | 0x9700 | 3 |
| 3 | 0 | 0x0000 | NULL |
| 4 | 2 | 0xC500 | 5 |
| 5 | 1 | 0x1100 | 6 |
| 6 | 1 | 0xFF00 | NULL |

| Kind of Queue 112-14-5 | Pointer 112-14-6 |
|---|---|
| Free | 2 |
| Clean | 1 |
| Dirty | 4 |

FIG. 33

HDD Management Table

| HDD# | Capacity | Used Parcels |
|---|---|---|
| 0 | 300[GB] | 1-50 |
| 1 | 300[GB] | 1-73 |
| 2 | 300[GB] | 1-3 |
| 3 | 0[GB] | NULL |
| 4 | 0[GB] | NULL |
| 5 | 0[GB] | NULL |
| 6 | 500[GB] | 37-85 |
| 7 | 500[GB] | 22-96 |

FIG. 34

| Vol# | Capacity | HDD# | Parcel# |
|---|---|---|---|
| 0 | 100[GB] | 0 | 11 |
| | | 1 | 54 |
| | | 2 | 23 |
| | | 3 | 7 |
| 1 | 300[GB] | 0 | 1 |
| | | 5 | 67 |
| | | 10 | 2 |
| | | 3 | 65 |
| 2 | N/A | N/A | N/A |
| | | N/A | N/A |
| | | N/A | N/A |
| | | N/A | N/A |
| 3 | 600[GB] | 4 | 91 |
| | | 5 | 3 |
| | | 2 | 94 |
| | | 3 | 12 |

Virtual Volume Management Table

FIG. 35

| Top LBA Addr. of Virtual Vol. Page | HDD# | Top LBA Addr. of Capacity Pool Page |
|---|---|---|
| 0x0000 | 0 | 0x4000 |
|  | 1 | 0x0200 |
|  | 2 | 0x0400 |
|  | 3 | 0x0600 |
| 0x0100 | 4 | 0x0200 |
|  | 1 | 0x0200 |
|  | 6 | 0x1000 |
|  | 3 | 0x0000 |
| 0x0200 | 0 | 0x0000 |
|  | 5 | 0x0000 |
|  | 2 | 0x0200 |
|  | 7 | 0x1400 |
| 0x0300 | N/A | N/A |
|  | N/A | N/A |
|  | N/A | N/A |
|  | N/A | N/A |

Virtual Volume Page Management Table

FIG. 36

| Capacity Pool Chunk# | Virtual Volume# | Used Capacity | Deleted Capacity | HDD# | Parcel# |
|---|---|---|---|---|---|
| 0 | 2 | 0kB | 0kB | 0 | 12 |
| | | | | 1 | 32 |
| | | | | 2 | 5 |
| | | | | 3 | 67 |
| 1 | 10 | 2048kB | 1024kB | 8 | 11 |
| | | | | 1 | 3 |
| | | | | 6 | 54 |
| | | | | 3 | 69 |
| 2 | 5 | 8192kB | 768kB | 4 | 1 |
| | | | | 5 | 37 |
| | | | | 2 | 84 |
| | | | | 7 | 15 |
| 3 | N/A | 0kB | 0kB | 0 | 19 |
| | | | | 1 | 26 |
| | | | | 2 | 10 |
| | | | | 3 | 33 |

Capacity Pool Chunk Management Table

FAST DATA RECOVERY FROM HDD FAILURE

This application is a continuation of U.S. patent application Ser. No. 13/544,417, filed on Jul. 9, 2012, which is a continuation of U.S. patent application Ser. No. 13/018,821, filed on Feb. 1, 2011, now U.S. Pat. No. 8,234,519, which is a continuation of U.S. patent application Ser. No. 12/257,487, filed Oct. 24, 2008, now U.S. Pat. No. 7,904,749, the entire disclosures of which are incorporated herein by reference.

BACKGROUND OF THE INVENTION

The present invention relates generally to data recovery in storage systems and, more particularly, to methods and apparatus for fast data recovery from storage device failure such as HDD (hard disk drive) failure. The invention demonstrates the agility of storage data recovery and ease of use of disk maintenance against disk failure.

Currently, RAID (Redundant Array of Independent Disks) architecture is generally used to protect data from disk failure. For example, RAID5 and RAID 6 each make it possible to recover from one disk failure of the RAID Group. RAID5 and RAID6 are each more efficient for capacity than RAID1 or RAID10. When a disk failure occurs, the storage system recovers data to a reserved "spare disk." It needs to access the entire area of healthy disks to recover data. The time to data recovery depends on disk capacity and disk throughput performance. Generally, the technology growth ratio of capacity is larger than that of throughput. As a result, the RAID approach is slow to rebuild from disk failure and will be slower each year. Long time data rebuild has the possibility of causing long time performance decrement by corrosion between rebuilt disk I/O and normal disk I/O. Long time data rebuild also has the possibility of encountering the next disk failure during data recovery.

Under another approach based on RAIN (Redundant Array of Independent Nodes), the storage system includes a plurality of nodes (disks, storage subsystems, and so on). The storage system stores data to suitably-chosen two or more nodes. When node failure occurs, the storage system copies the data to another node(s) from redundant data. It can be conducive to better rebuild performance by a pillared process. Because the RAID approach needs to reserve one or more spare disk, the rebuild time under the RAIN approach will be faster than that under the RAID approach. The RAIN approach does not need reserved spare disk because it automatically stores redundant data to free space (self-recovery). On the other hand, the capacity efficiency under the RAIN approach is lower than that under the RAID approach.

BRIEF SUMMARY OF THE INVENTION

Embodiments of the invention provide methods and apparatus for fast data recovery from storage device failure such as HDD failure. Employing data distribution in plural disks, RAID in distributed data, page mapping management between virtual volume and physical disks, and parallel access data recovery by copying from pages to pages, the invention achieves fast rebuild, capacity efficiency, and self-recovery.

In accordance with an aspect of the present invention, a storage system comprises a first storage device having a first plurality of hard disk drives and a first controller controlling the first plurality of hard disk drives. The first controller stores data in the first plurality of hard disk drives by stripes, each stripe includes M data and N parity data, where M and N are integers, and the first controller calculates for each stripe the N parity data using the M data. The M data and N parity data of each stripe are allocated to M+N hard disk drives of the first plurality of hard disk drives. A first hard disk drive of the first plurality of hard disk drives includes data or parity data of both a first stripe of the stripes and a second stripe of the stripes, while a second hard disk drive of the first plurality of hard disk drives includes data or parity data of only one of the first stripe of the stripes or the second stripe of the stripes. During data recovery involving failure of one of the first plurality of hard disk drives as a failed hard disk drive, the data in the failed hard disk drive is recovered for each stripe by calculation using data and parity data in other hard disk drives of the first plurality of hard disk drives for each stripe.

In some embodiments, the second hard disk drive of the first plurality of hard disk drives includes data or parity data of the first stripe of the stripes. A third hard disk drive of the first plurality of hard disk drives includes data or parity data of the second stripe of the stripes and does not include data or parity data of the first stripe of the stripes. In addition, M is 3 and N is 1. The number of the first plurality of hard disk drives is a multiple of four. Data and parity data of the first stripe are included in the first and second hard disk drives of the first plurality of hard disk drives and in fourth and fifth hard disk drives of the first plurality of hard disk drives. Data and parity data of the second stripe are included in the first, third, fourth, fifth hard disk drives of the first plurality of hard disk drives.

In specific embodiments, the storage system further comprises a second storage device having a second plurality of hard disk drives and a second controller controlling the second plurality of hard disk drives. The data stored by the first controller is received from the second storage device. The first controller includes a plurality of processors. The second hard disk drive and the third hard disk drive are accessed by different processors of the plurality of processors concurrently when data is migrated from the second storage device to the first storage device. The storage system further comprises a capacity pool volume having unallocated hard disk drives of the first plurality of the hard disk drives. The stripes are allocated from the capacity pool volume. The allocation of each stripe is conducted in response to receiving the data from the second storage device. The N parity data of each stripe are coupled to the first controller via different buses.

In some embodiments, the storage system further comprises a second storage device having a second plurality of hard disk drives and a second controller controlling the second plurality of hard disk drives. The data stored by the first controller is received from the second storage device. Data and parity data of the first and second stripes are processed in parallel by the first controller. The first controller includes a table including information of allocation of each stripe to the first plurality of hard disk drives. M is 6 and N is 2. The number of the first plurality of hard disk drives is a multiple of eight. In case of reading data from one of the stripes including a failure of one of the first plurality of hard disk drives, the first controller is controlled to access only seven hard disk drives of the first plurality of hard disk drives without access to the failed hard disk drive. The storage system further comprises a capacity pool volume having unallocated hard disk drives of the first plurality of the hard disk drives. The stripes are allocated from the capacity pool volume. The storage system further comprises a second storage device having a second plurality of hard disk drives and a second controller controlling the second plurality of hard disk drives. The allocation of each stripe is conducted in response to receiving the data from the second storage device.

Another aspect of the invention is directed to a method for data recovery in a storage system which includes a first storage device having a first plurality of hard disk drives and a first controller controlling the first plurality of hard disk drives. The method comprises storing data in the first plurality of hard disk drives of the first controller by stripes, each stripe includes M data and N parity data, where M and N are integers, and the first controller calculates for each stripe the N parity data using the M data; allocating the M data and N parity data of the each stripe to M+N hard disk drives of the first plurality of hard disk drives, wherein a first hard disk drive of the first plurality of hard disk drives includes data or parity data of both a first stripe of the stripes and a second stripe of the stripes, while a second hard disk drive of the first plurality of hard disk drives includes data or parity data of only one of the first stripe of the stripes or the second stripe of the stripes; and during data recovery involving failure of one of the first plurality of hard disk drives as a failed hard disk drive, recovering the data in the failed hard disk drive for each stripe by calculation using data and parity data in other hard disk drives of the first plurality of hard disk drives for each stripe.

Another aspect of the invention is directed to a computer-readable medium storing a plurality of instructions for controlling a data processor to perform data recovery in a storage system which includes a first storage device having a first plurality of hard disk drives and a first controller controlling the first plurality of hard disk drives. The computer-readable medium comprises instructions that cause the data processor to store data in the first plurality of hard disk drives of the first controller by stripes, each stripe includes M data and N parity data, where M and N are integers, and the first controller calculates for each stripe the N parity data using the M data; instructions that allocate the M data and N parity data of the each stripe to M+N hard disk drives of the first plurality of hard disk drives, wherein a first hard disk drive of the first plurality of hard disk drives includes data or parity data of both a first stripe of the stripes and a second stripe of the stripes, while a second hard disk drive of the first plurality of hard disk drives includes data or parity data of only one of the first stripe of the stripes or the second stripe of the stripes; and instructions that, during data recovery involving failure of one of the first plurality of hard disk drives as a failed hard disk drive, recover the data in the failed hard disk drive for each stripe by calculation using data and parity data in other hard disk drives of the first plurality of hard disk drives for the each stripe. The data processor may reside in the first controller.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of a RAID Group Management Table in the memory of FIG. 2.

FIG. 4 illustrates an example of a Virtual Volume Management Table in the memory of FIG. 2.

FIG. 5 illustrates an example of a Virtual Volume Page Management Table in the memory of FIG. 2.

FIG. 6 illustrates an example of a Capacity Pool Chunk Management Table in the memory of FIG. 2.

FIG. 7 illustrates an example of a Capacity Pool Page Management Table in the memory of FIG. 2.

FIG. 8 illustrates an example of a Cache Management Table in the memory of FIG. 2.

FIG. 33 illustrates an example of an HDD Management Table in the memory of FIG. 32.

FIG. 34 illustrates an example of a Virtual Volume Management Table in the memory of FIG. 32.

FIG. 35 illustrates an example of a Virtual Volume Page Management Table in the memory of FIG. 32.

FIG. 36 illustrates an example of a Capacity Pool Chunk Management Table in the memory of in FIG. 32.

DETAILED DESCRIPTION OF THE INVENTION

Figure 1:
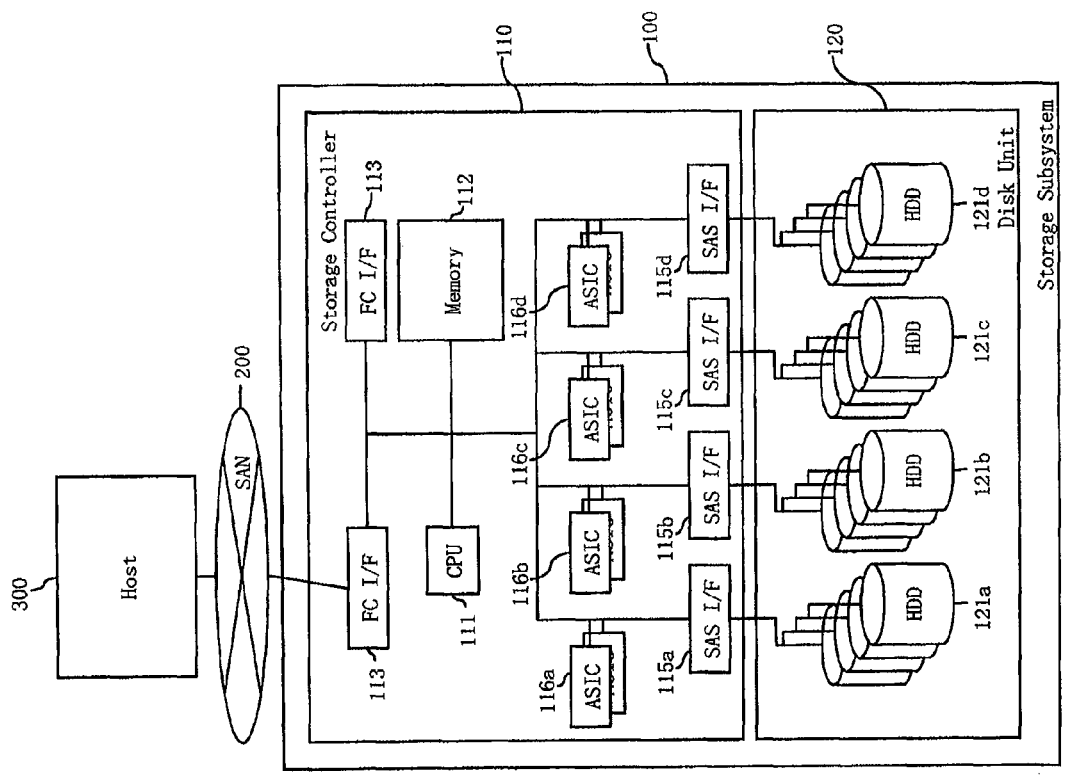
FIG. 1 illustrates the hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Exemplary embodiments of the invention, as will be described in greater detail below, provide apparatuses, methods and computer programs for fast data recovery from storage device failure.

FIG. 1 illustrates the hardware configuration of a system in which the method and apparatus of the invention may be applied. A storage subsystem 100 is connected via a SAN (storage area network) to a host computer 300. The storage subsystem 100 includes a storage controller 110 and a disk unit 120. The storage controller 110 has a CPU 111 that controls the storage subsystem 100 and runs the programs and uses the tables stored in a memory 112. The memory 112 stores data in addition to programs and tables. A channel interface 113 is provided for interfacing with the SAN 200. The storage controller 110 includes disk interfaces 115a to 115d that are linked to disks 121a to 121d in the disk unit 120. The storage controller 110 further includes data transfer controllers 116a to 116d configured to transfer data between the memory 112 and the disks 121, and to calculate data to generate parity data or recovery data. The disk unit 120 provides nonvolatile disks 121 for storing data.

First Embodiment

Figure 2:
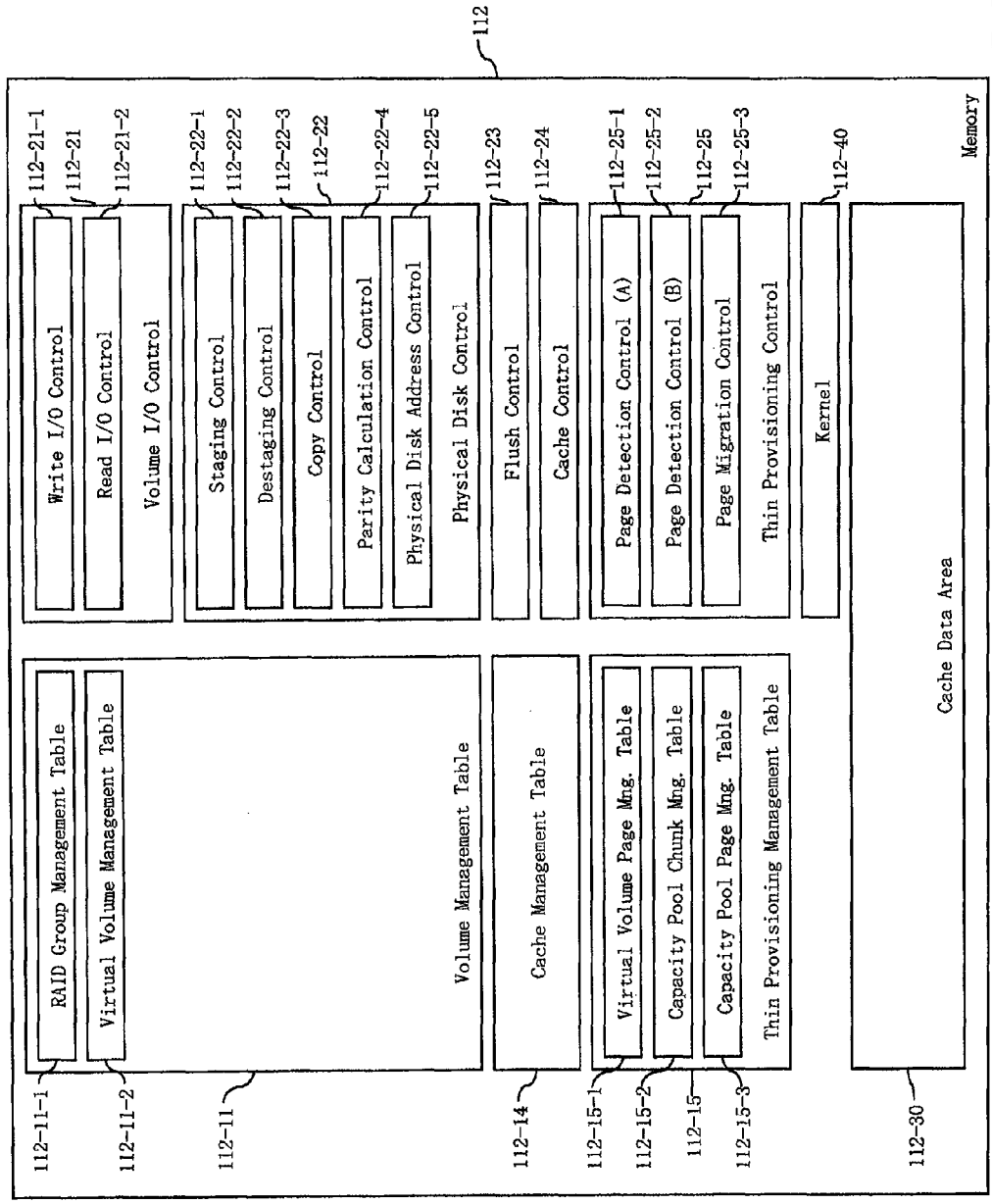
FIG. 2 illustrates an example of a memory in the storage subsystem of FIG. 1 according to a first embodiment of the invention.

FIG. 2 illustrates an example of a memory 112 in the storage subsystem 100 of FIG. 1 according to a first embodiment of the invention. The memory 112 includes a Volume Management Table 112-11 that has a RAID Group Management Table 112-11-1 for the physical structure management for the disks 121 and those groups (FIG. 3), and a virtual Volume Management Table 112-11-2 for volume configuration management (FIG. 4). A Cache Management Table 112-14 (FIG. 8) is provided for managing the cache data area 112-30 and for LRU/MRU management. A thin Provisioning Management Table 112-15 includes a Virtual Volume Page Management Table 112-15-1 (FIG. 5) for reference management from a partition of a virtual volume to a partition of a capacity pool, a Capacity Pool Chunk Management Table 112-15-2 (FIG. 6) for resource management of a capacity pool and reference management from a capacity pool page to a virtual volume page, and a Capacity Pool Page Management Table 112-15-3 (FIG. 7) for resource management of a capacity pool chunk. A Volume I/O Control 112-21 includes a Write I/O Control 112-21-1 (FIG. 17) that runs by a write I/O requirement and receives write data and stores to the cache data area 112-30 via the channel interface 113, and a Read I/O Control 112-21-2 (FIG. 18) that runs by a read I/O requirement and sends read data from the cache data area 112-30 via the channel interface 113. A Physical Disk Control 112-22 includes a Staging Control 112-22-1 (FIG. 19) that transfers data from the disks 121 to the cache data area 112-30, a Destaging Control 112-22-2 (FIG. 20) that transfers data from the cache data area 112-30 to the disks 121, a Copy Control 112-22-3 (FIG. 21) that copies data in the cache data area 112-30, a Parity Calculation Control 112-22-4 (FIG. 22) that calculates redundant data stored in the disks 121 and recovers lost data in the disks 121, and a Physical Disk Address Control 112-22-5 (FIG. 23) that calculates and resolves the physical address of capacity pool data. The memory 112 further includes a Flush Control 112-23 (FIG. 24) that periodically flushes dirty data from the cache data area 112-30 to the disks 121, and a Cache Control 112-24 (FIG. 25) that finds cached data in the cache data area 112-30 and allocates a new cache area in the cache data area 112-30. A Thin Provisioning Control 112-25 includes a Page Detection Control 112-25-1 (FIG. 26) that searches a capacity pool page referred to by a virtual volume page (If no capacity pool page is allocated to the virtual volume page, it allocates a new capacity pool page to the virtual volume page), a Page Detection Control 112-25-2 (FIG. 27) that searches a capacity pool page referred to by a virtual volume page (If no capacity pool page is allocated to the virtual volume page, it answers a "zero reserved page" address), and a Page Migration Control 112-25-3 (FIG. 28) that migrates capacity pool pages to other capacity pages when disk failure occurs. The memory 112 includes a kernel 112-40 that controls the schedules of running program, supports a multi-task environment. If a program waits for an ack (acknowledgement), the CPU 111 changes to run another task (e.g., data transfer waiting from the disk 121 to the cache data area 112-30). The cache data area 112-30 stores read and write cache data, and is separated into plural cache slots.

FIG. 3 illustrates an example of a RAID Group Management Table 112-11-1 in the memory 112 of FIG. 2. The RAID Group Management Table 112-11-1 includes columns of the RAID Group Number 112-11-1-1 as the ID of the RAID group, and RAID Level 112-11-1-2 representing the structure of RAID group. For example, "5×N" (N is number) means "RAID Level is 5 (3D+1P)" and "consists of 8N HDDs". "N/A" means the RAID Group does not exist. The RAID Group Management Table 112-11-1 further includes columns of the HDD Number 112-11-1-3 representing the ID list of HDDs belong to the RAID group, RAID Group Capacity 112-11-1-4 representing the total capacity of the RAID group except redundant area, Free Chunk Queue Index 112-11-1-5 for managing unused thin provisioning chunks, and Used Chunk Queue Index 112-11-1-6 for managing used thin provisioning chunks.

FIG. 4 illustrates an example of a Virtual Volume Management Table 112-11-2 in the memory 112 of FIG. 2. The Virtual Volume Management Table 112-11-2 includes columns of the Virtual Volume Number 112-11-2-1 representing the ID of the virtual volume, Virtual Volume Capacity 112-11-2-2 representing the capacity of the virtual volume ("N/A" means the virtual volume doesn't exist), Using RAID Group Number 112-11-2-3 representing the RAID group ID of a chunk that the virtual volume currently uses, and Using Chunk Number or Using Capacity Pool Chunk Number 112-11-2-4 representing the chunk ID that the virtual volume currently uses.

FIG. 5 illustrates an example of a Virtual Volume Page Management Table 112-15-1 in the memory 112 of FIG. 2. The Virtual Volume Page Management Table 112-15-1 includes columns of the Virtual Volume Page Index 112-15-1-1 representing the top address of the virtual volume page, RAID Group Number 112-15-1-2 representing the RAID group ID to which the virtual volume page belongs ("N/A" means no capacity pool page is allocated to the virtual volume page), and Capacity Pool Page Index 112-15-1-3 representing the top address of a capacity pool page to which the virtual volume page refers.

FIG. 6 illustrates an example of a Capacity Pool Chunk Management Table 112-15-2 in the memory 112 of FIG. 2. The Capacity Pool Chunk Management Table 112-15-2 includes columns of the Capacity Pool Chunk Number 112-15-2-1 representing the ID of the capacity pool chunk, Virtual Volume Number 112-15-2-2 representing the ID of a virtual volume by which the capacity pool chunk is referred, Used Capacity 112-15-2-3 representing the used capacity of the capacity pool chunk, Deleted Capacity 112-15-2-4 representing the removed capacity of the capacity pool chunk once the area has used, Previous Chunk Number 112-15-2-5 representing the previous chunk pointer for queue management, and Next Chunk Number 112-15-2-6 representing the next chunk pointer for queue management ("NULL" means a terminal of the queue).

FIG. 7 illustrates an example of a Capacity Pool Page Management Table 112-15-3 in the memory 112 of FIG. 2. The Capacity Pool Page Management Table 112-15-3 includes columns of the Capacity Pool Page Index 112-15-3-1 representing the ID of the capacity pool page, and Virtual Volume Page Number 112-15-3-2 representing the ID of a virtual volume page by which the capacity pool page is referred ("NULL" means the capacity pool page is unused).

FIG. 8 illustrates an example of a Cache Management Table 112-14 in the memory 112 of FIG. 2. The Cache Management Table 112-14 includes columns of the Cache Slot Number 112-14-1 representing the ID of the cache slot in the cache data area 112-30, Disk Number 112-14-2 representing the ID of the disk 121 in which the cache slot stores data, Disk Address 112-14-3 representing the disk address in which the cache slot stores data, Next Slot Pointer 112-14-4 representing the next cache slot number for queue management ("NULL" means a terminal of the queue), Kind of Queue Information 112-14-5 representing the kind of cache slot queue ("Free" means a queue that has the unused cache slots, "Clean" means a queue that has cache slots that stores same data with the disk slots, and "Dirty" means a queue that has cache slots that stores different data with the disk slots, so the Storage Controller 110 needs to flush the cache slot data to the disk slot in the future), Queue Index Pointer 112-14-6 representing the index of the cache slot queue.

Figure 9:
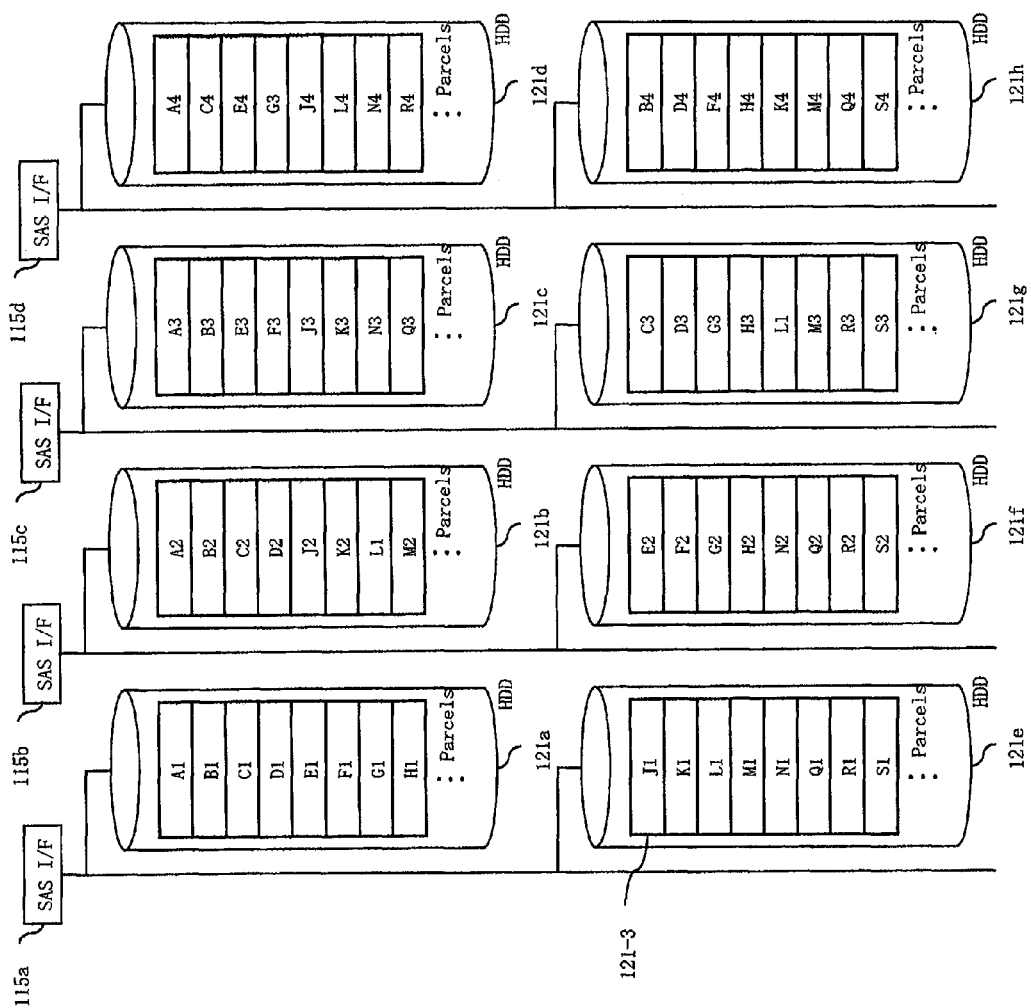
FIG. 9 illustrates an example of a 5×2 RAID group having eight HDDs each including a plurality of parcels.
Figure 10:
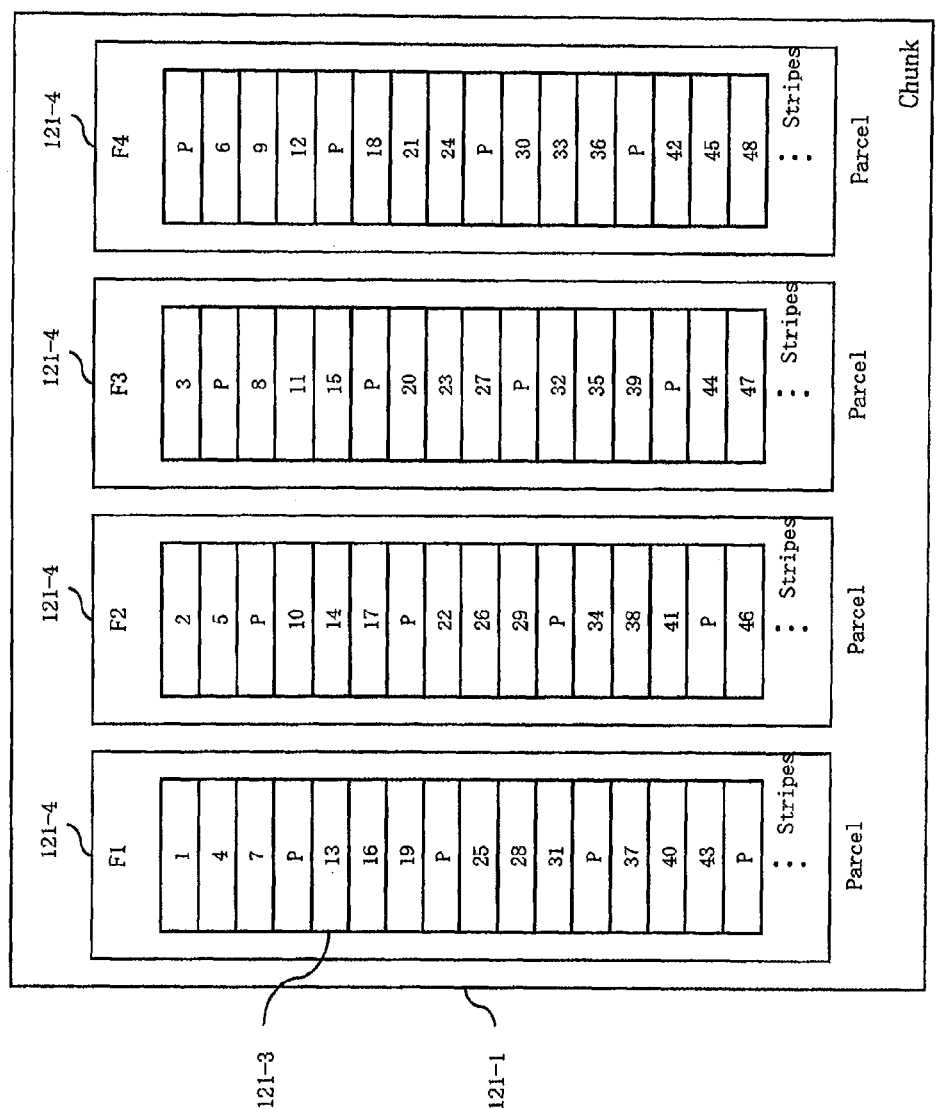
FIG. 10 illustrates an example of a chunk having a plurality of parcels each including a plurality of stripes.
Figure 11:
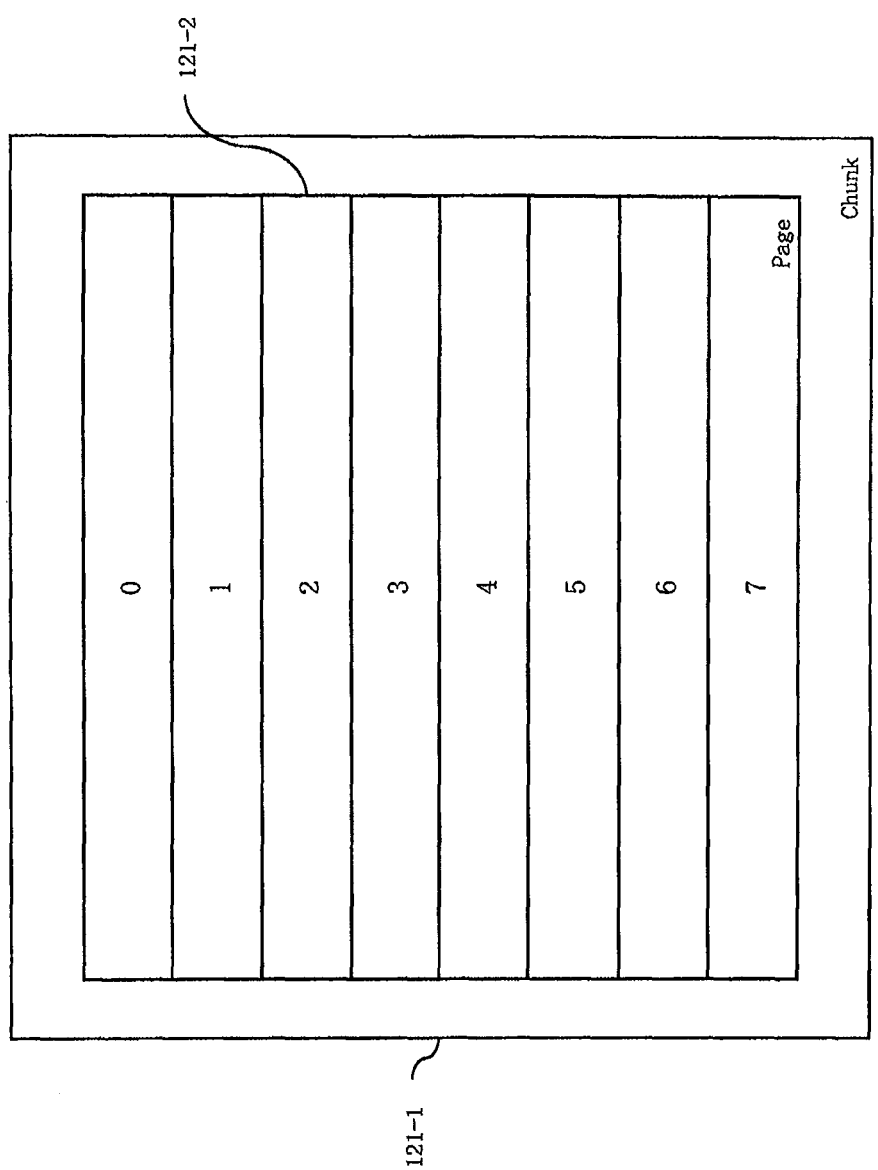
FIG. 11 illustrates an example of a chunk having a plurality of pages.

FIGS. 9-11 are provided to show data alignment. FIG. 9 illustrates an example of a 5×2 RAID group having eight HDDs each including a plurality of "parcels." A parcel consists of a continued plurality of stripes of the same HDD. FIG. 10 illustrates an example of a chunk having a plurality of parcels each including a plurality of stripes. The disks 121a, 121b, 121c, 121d, 121e, 121f, 121g and 121h make up the RAID group. The RAID level of this RAID group is expressed as "5×2" in RAID Level 2-11-1-2. Each disk is divided into plural parcels 121-4. Each parcel 121-4 divided into plural capacity pool stripes 121-3. Four parcels 121-4 make up a chunk 121-1. Each of the four parcels 121-4 in a chunk 121-1 belongs to one disk 121 connected to different disk interfaces 115a-115d to avoid two points of failure. The selection of these four parcels 121-4 follows the evenly-distributed algorithm. Each chunk 121-1 has plural capacity pool stripes 121-3 that make up a redundant array. Each chunk 121-1 is divided into plural capacity pool pages 121-2, as illustrated in FIG. 11. Each capacity pool page 121-2 is a thin provisioning allocation unit. Each capacity pool page 121-2 includes plural capacity pool stripes 121-3.

In general, the storage controller stores data in the hard disk drives by stripes, each stripe includes M data and N parity data, where M and N are integers, and the storage controller calculates for each stripe the N parity data using the M data. The M data and N parity data of each stripe are allocated to M+N hard disk drives. A first hard disk drive includes data or parity data of both a first stripe of the stripes and a second stripe of the stripes, while a second hard disk drive includes data or parity data of only one of the first stripe of the stripes or the second stripe of the stripes. During data recovery involving failure of one of the hard disk drives, the data in the failed hard disk drive is recovered for each stripe by calculation using data and parity data in other hard disk drives of the first plurality of hard disk drives for each stripe, as discussed in detail below in connection with FIGS. 29-31.

In some cases, the second hard disk drive includes data or parity data of the first stripe of the stripes. A third hard disk drive includes data or parity data of the second stripe of the stripes and does not include data or parity data of the first stripe of the stripes. In addition, M is 3 and N is 1. The number of hard disk drives is a multiple of four. Data and parity data of the first stripe are included in the first and second hard disk drives and in fourth and fifth hard disk drives. Data and parity data of the second stripe are included in the first, third, fourth, fifth hard disk drives. The second hard disk drive and the third hard disk drive are accessed by different processors concurrently when data is migrated from another storage device to the instant storage device. The N parity data of each stripe are coupled to the first controller via different buses.

Figure 12:
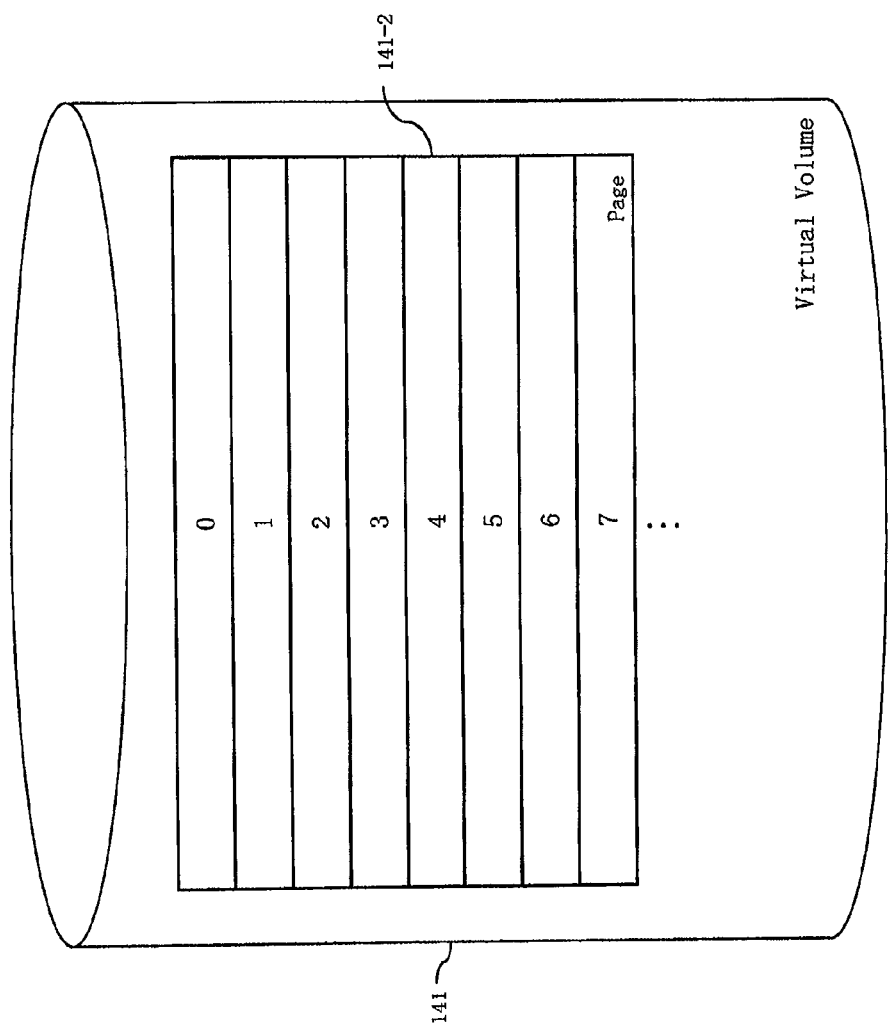
FIG. 12 illustrates an example of a virtual volume having a plurality of pages.
Figure 13:
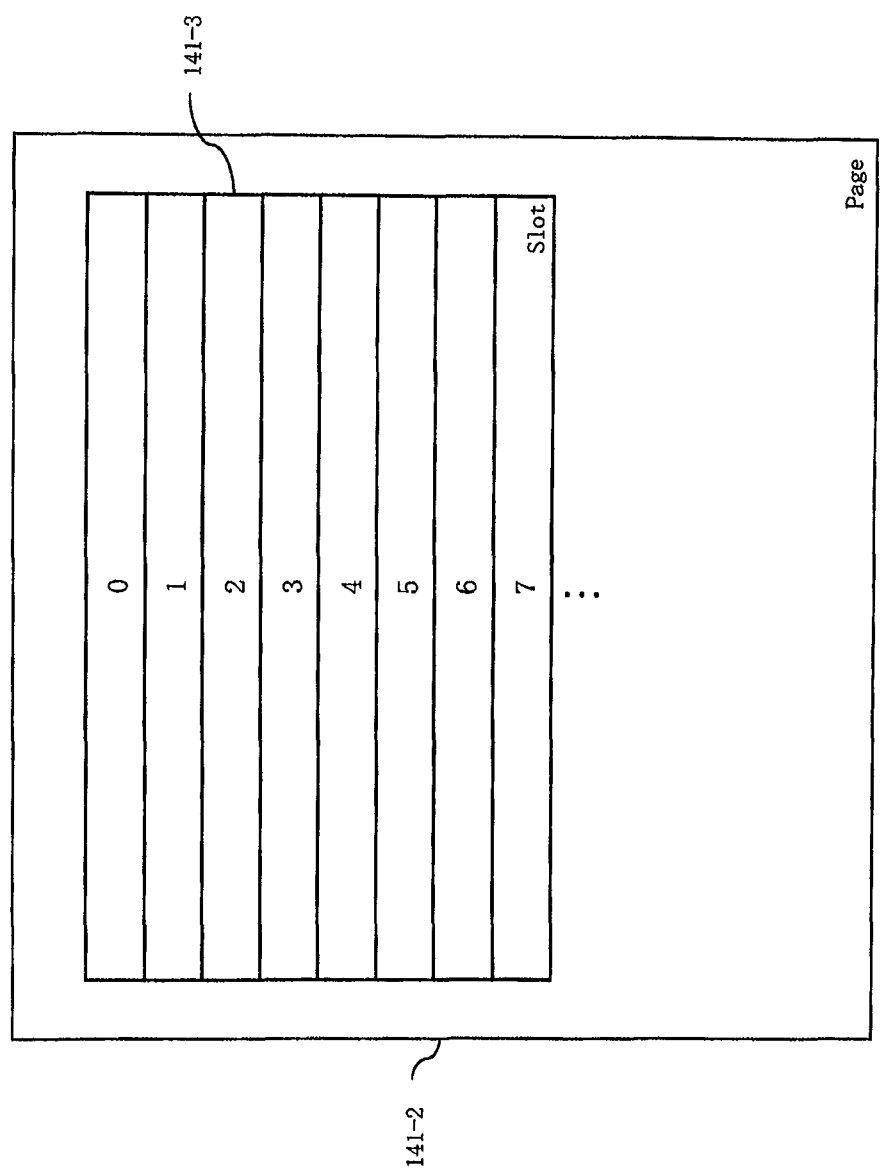
FIG. 13 illustrates an example of a page having a plurality of slots.

FIG. 12 illustrates an example of a virtual volume 141 having a plurality of virtual volume pages 141-2. The size of a virtual volume page 141-2 equals to the size of a capacity pool page 121-2 except for redundant capacity. The virtual volume page 141-2 is divided into virtual volume slots 141-3, as seen in FIG. 13. The number of virtual volume slots 141-3 in one virtual volume page 141-2 equals to the number of capacity pool stripes 121-3 in one capacity pool page 121-2 except for redundant stripes.

Figure 14:
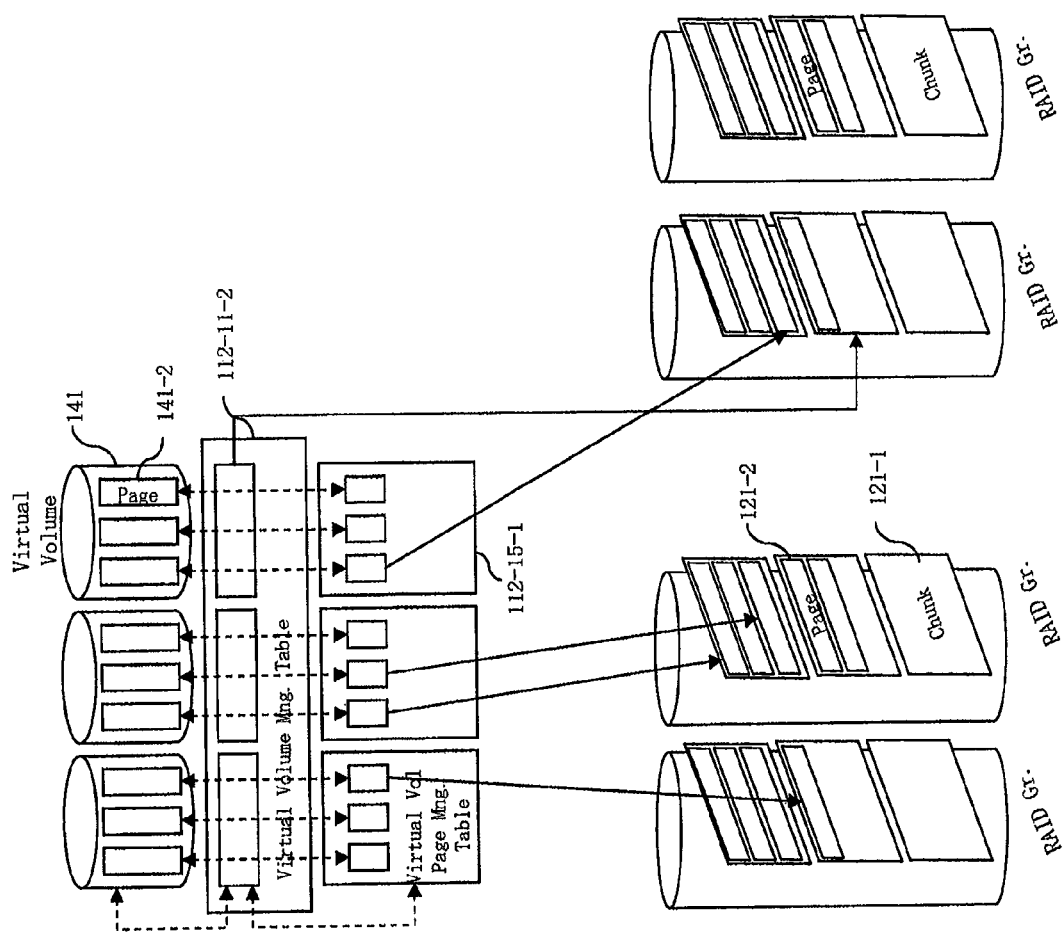
FIG. 14 illustrates an example of a virtual volume and its Virtual Volume Management Table and Virtual Volume Page Management Table.

FIG. 14 illustrates an example of a virtual volume 141 and its Virtual Volume Management Table 112-11-2 and Virtual Volume Page Management Table 112-15-1. A solid arrowed line means that an object refers by pointer (from the Virtual Volume Page Management Table 112-15-1 to the capacity pool chunk 121-1 and capacity pool page 121-2), while a dashed arrowed line means that an object refers by calculation (among the virtual volume 141 and the management tables 112-11-2 and 112-15-1). The virtual volume 141 and the Virtual Volume Management Table 112-11-2 are on a one-to-one relation. The Virtual Volume Management Table 112-11-2 shows capacity using the current capacity pool chunks 121-1. The virtual volume page 141-2 and the Virtual Volume Page Management Table 112-15-1 are on a one-to-one relation. The Virtual Volume Page Management Table 112-15-1 refers to the capacity pool page 121-2, if a page is allocated.

Figure 15:
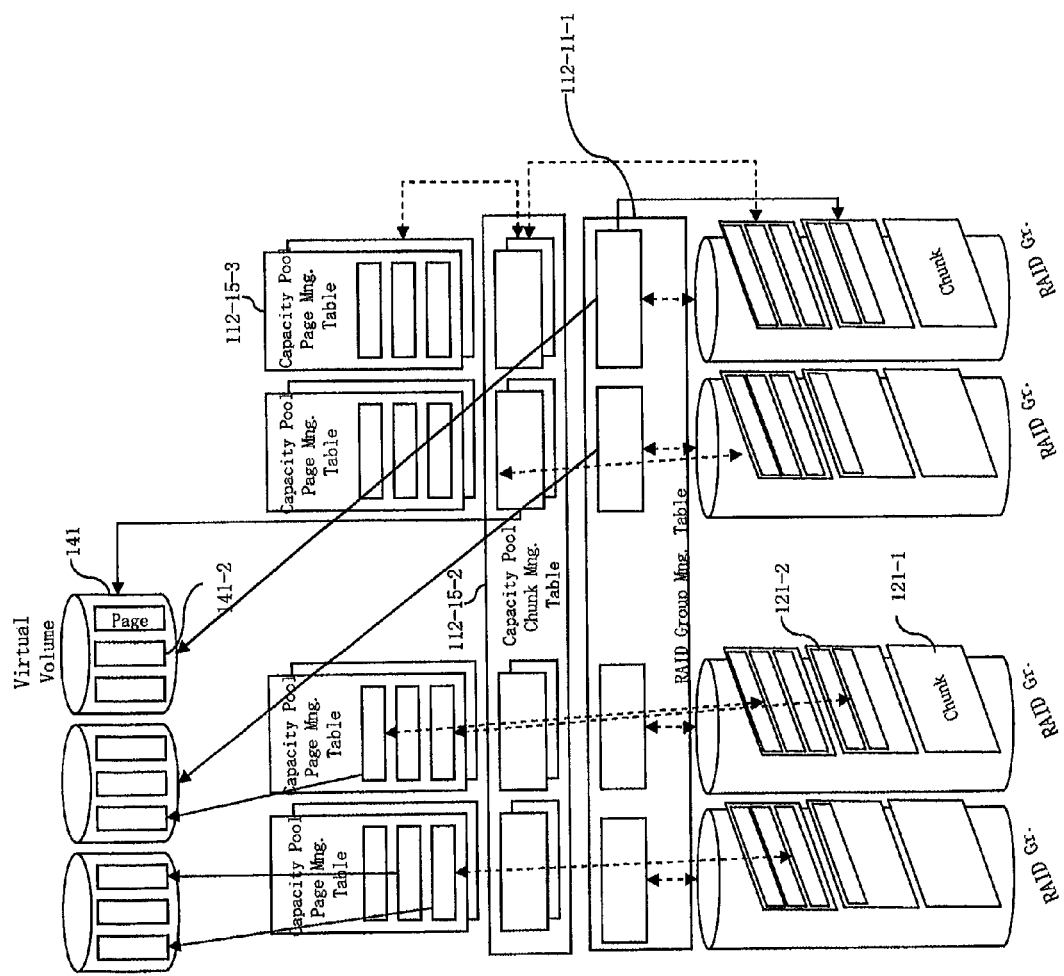
FIG. 15 illustrates an example of the table reference structure toward capacity pool in the virtual volume of FIG. 14.

FIG. 15 illustrates an example of the table reference structure toward capacity pool in the virtual volume 141 of FIG. 14. A solid arrowed line means that an object refers by pointer (from the Capacity Pool Page Management Table 112-15-3 and the RAID Group Management Table 112-11-1 to the virtual volume 141 and virtual volume page 141-2, and from the RAID Group Management Table 112-11-1 to the capacity pool chunk 121-1). A dashed arrowed line means that an object refers by calculation (among the Capacity Pool Page Management Table 112-15-3, Capacity Pool Chunk Management Table 112-15-2, RAID Group Management Table 112-11-1, and the RAID groups (including capacity pool chunk 121-1 and capacity pool page 121-2). The RAID group and RAID Group Management Table 112-11-1 are on a one-to-one relation. The RAID Group Management Table 112-11-1 refers to used and unused capacity pool chunk 112-1. The capacity pool chunk 121-1 and Capacity Pool Chunk Management Table 112-15-2 are on a one-to-one relation. The Capacity Pool Chunk Management Table 112-15-2 refers to the virtual volume 141. The capacity pool page 121-2 and Capacity Pool Page Management Table 112-15-3 are on a one-to-one relation. The Capacity Pool Page Management Table 112-15-3 refers to the virtual volume page 141-2.

Figure 16:
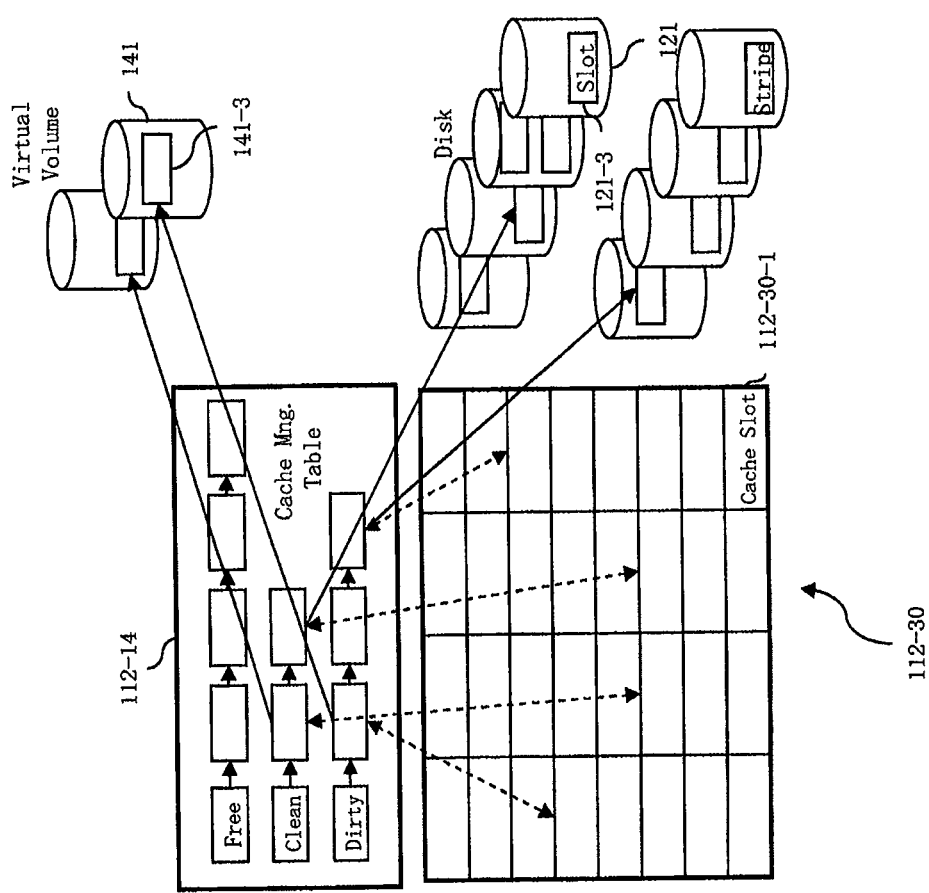
FIG. 16 illustrates an example of the table reference structure toward virtual volumes.

FIG. 16 illustrates an example of the table reference structure toward virtual volumes 141. A solid arrowed line means that an object refers by pointer (from the Cache Management Table 112-14 to the virtual volume slots 141-3 and the capacity pool stripes 121-3). A dashed arrowed line means that an object refers by calculation (between the Cache Management Table 112-14 and the cache slots 112-30-1). The cache data area 112-30 is divided to plural cache slots 112-30-1. The size of a cache slot 112-30-1 equals to the size of a capacity pool stripe 121-3 and equal to the size of a virtual volume slot 141-3. The Cache Management Table 112-14 and the cache slot 112-30-1 are on a one-to-one relation. The Cache Management Table 112-14 refers to the virtual volume slot 141-3 and the capacity pool stripe 121-3.

Figure 17:
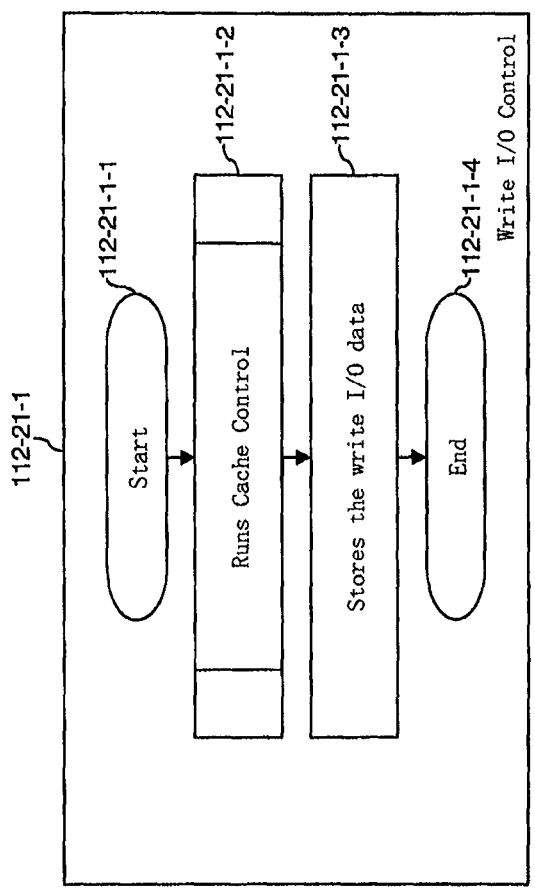
FIG. 17 illustrates an example of a process flow of the Write I/O Control in the memory of FIG. 2.

FIG. 17 illustrates an example of a process flow of the Write I/O Control 112-21-1 in the memory 112 of FIG. 2. The program starts at 112-21-1-1. In step 112-21-1-2, the program calls the Cache Control 112-24 to search the cache slot 112-30-1. In step 112-21-1-3, the program receives the write I/O data from the host computer 300 and stores the data to the aforementioned cache slot 112-30-1. The program ends at 112-21-1-4.

Figure 18:
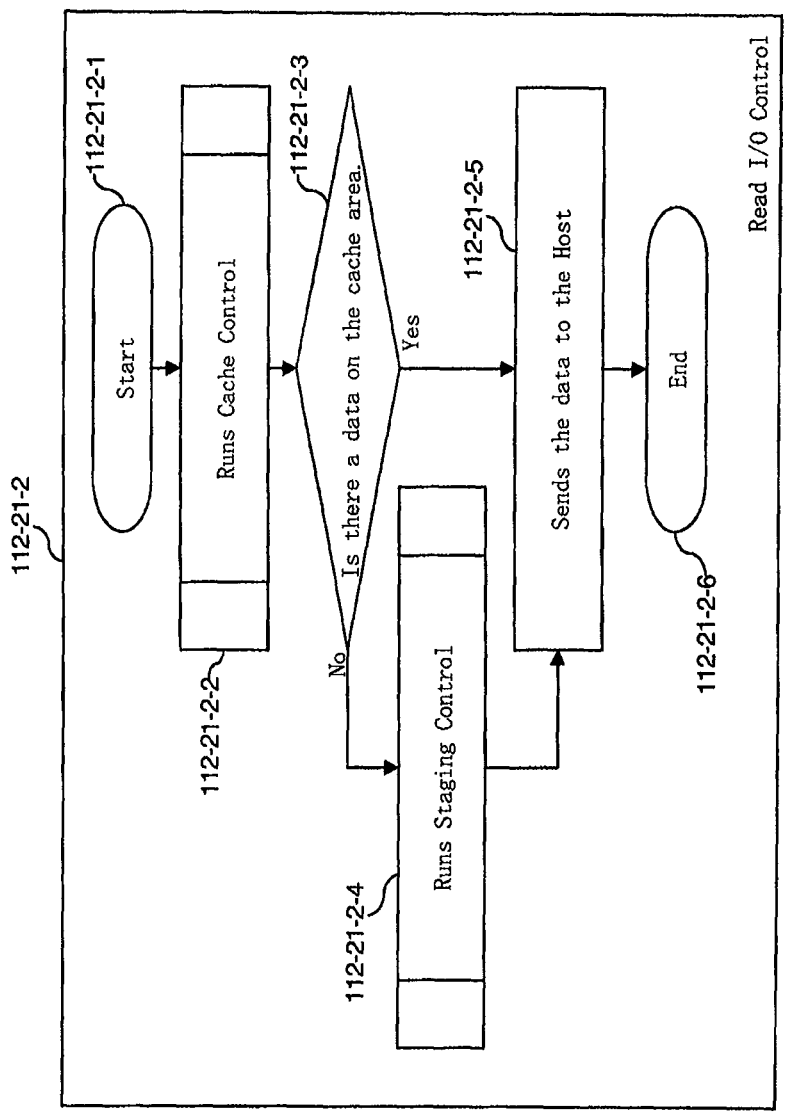
FIG. 18 illustrates an example of a process flow of the Read I/O Control in the memory of FIG. 2.

FIG. 18 illustrates an example of a process flow of the Read I/O Control 112-21-2 in the memory 112 of FIG. 2. The program starts at 112-21-2-1. In step 112-21-2-2, the program calls the Cache Control 112-24 to search the cache slot 112-30-1. In step 112-21-2-3, the program checks the status of the aforementioned cache slot 112-30-1 to determine whether the data has already been stored there or not. If the data is not stored in the cache slot 112-30-1, the program calls the Staging Control 112-22-1 in step 112-21-2-4. In step 112-21-2-5, the program transfers the data in the cache slot 112-30-1 to the host computer 300. The program ends at 112-21-2-6.

Figure 19:
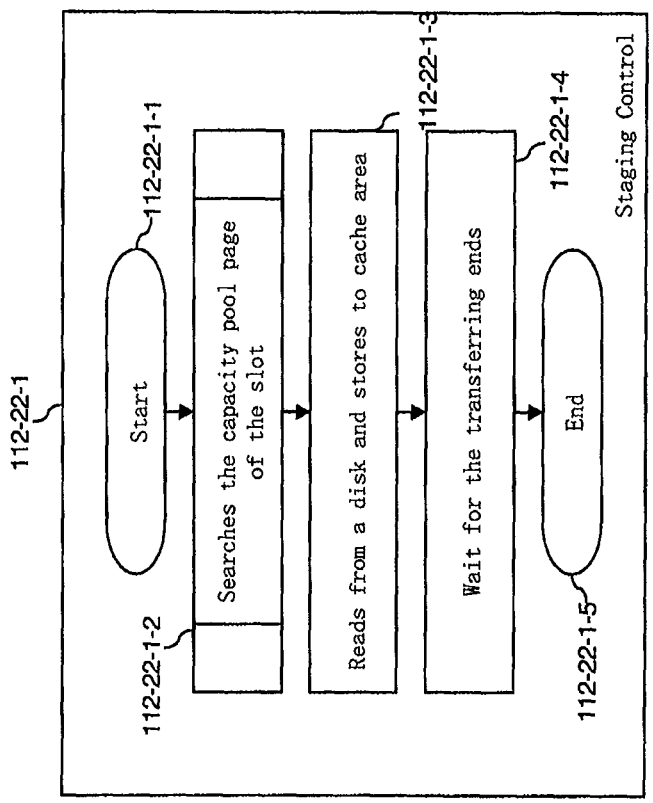
FIG. 19 illustrates an example of a process flow of the Staging Control in the memory of FIG. 2.

FIG. 19 illustrates an example of a process flow of the Staging Control 112-22-1 in the memory 112 of FIG. 2. The program starts at 112-22-1-1. In step 112-22-1-2, the program calls the Physical Disk Address Control 112-22-5 to find the physical disk and address of the data. In step 112-22-1-3, the program requests the data transfer controller 116 to read data from the disk 121 and store it to the cache data area 112-30. In step 112-22-1-4, the program waits for the data transfer to end. The kernel 112-40 in the memory 112 will issue an order to do context switch. The program ends at 112-22-1-5.

Figure 20:
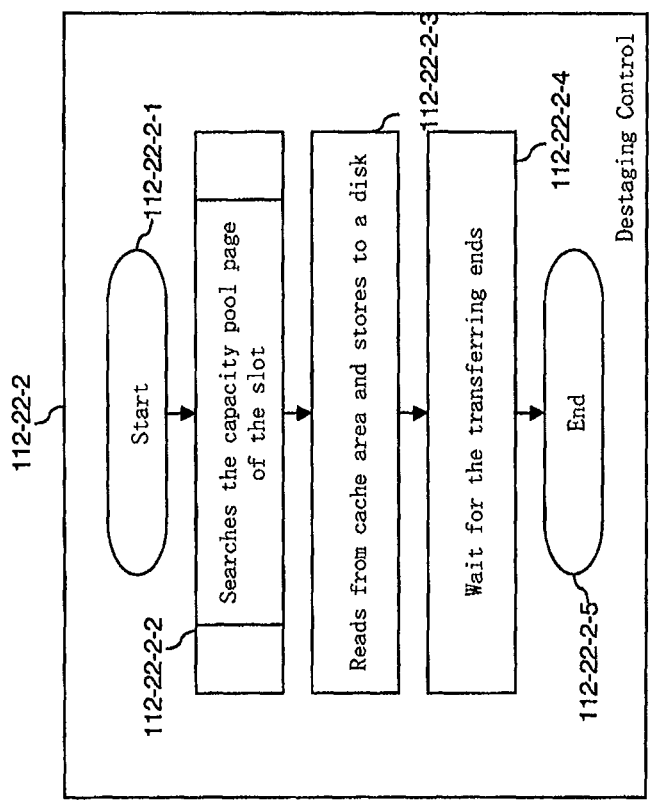
FIG. 20 illustrates an example of a process flow of the Destaging Control in the memory of FIG. 2.

FIG. 20 illustrates an example of a process flow of the Destaging Control 112-22-2 in the memory 112 of FIG. 2. The program starts at 112-22-2-1. In step 112-22-2-2, the program calls the Physical Disk Address Control 112-22-5 to find the physical disk and address of the data. In step 112-22-2-3, the program requests the data transfer controller 116 to read data from the cache data area 112-30 and store it to the disk 121. In step 112-22-2-4, the program waits for the data transfer to end. The kernel 112-40 in the memory 112 will issue an order to do context switch. The program ends at 112-22-2-5.

Figure 21:
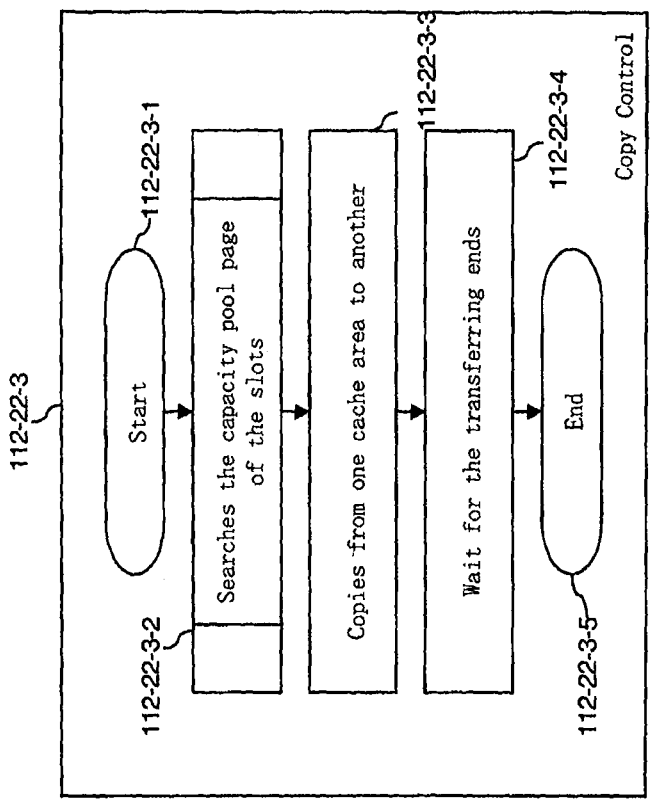
FIG. 21 illustrates an example of a process flow of the Copy Control in the memory of FIG. 2.

FIG. 21 illustrates an example of a process flow of the Copy Control 112-22-3 in the memory 112 of FIG. 2. The program starts at 112-22-3-1. In step 112-22-3-2, the program calls the Physical Disk Address Control 112-22-5 to find the physical disk and address of the data. In step 112-22-3-3, the program requests the data transfer controller 116 to copy the data in the cache data area 112-30. In step 112-22-3-4, the program waits for the data transfer to end. The kernel 112-40 in the memory 112 will issue an order to do context switch. The program ends at 112-22-3-5.

Figure 22:
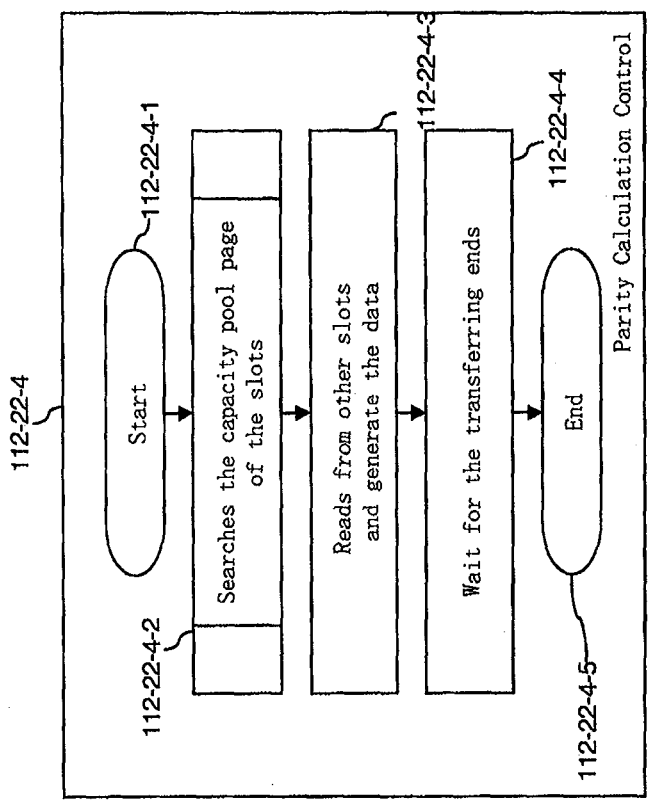
FIG. 22 illustrates an example of a process flow of the Parity Calculation Control in the memory of FIG. 2.

FIG. 22 illustrates an example of a process flow of the Parity Calculation Control 112-22-4 in the memory 112 of FIG. 2. The program starts at 112-22-4-1. In step 112-22-4-2, the program calls the Physical Disk Address Control 112-22-5 to find the physical disk and address of the data. In step 112-22-4-3, the program requests the data transfer controller 116 to generate/recover the data in the cache data area 112-30. In step 112-22-4-4, the program waits for the data transfer to end. The kernel 112-40 in the memory 112 will issue an order to do context switch. The program ends at 112-22-4-5.

Figure 23:
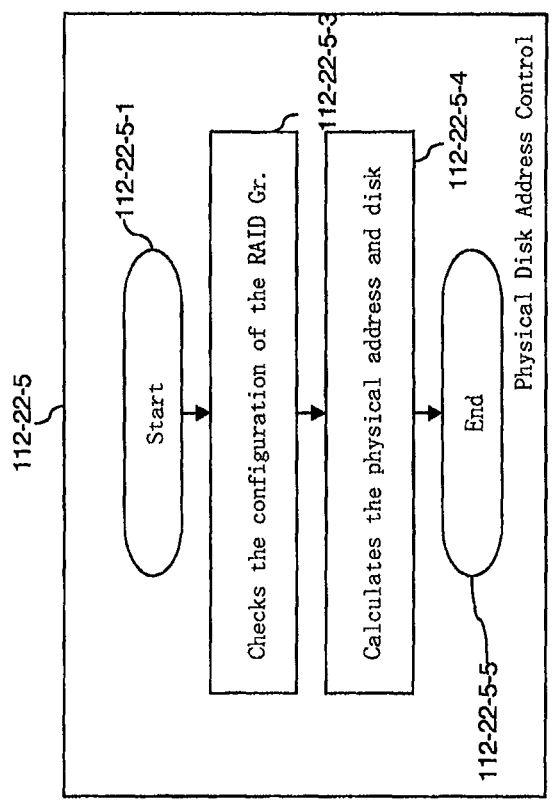
FIG. 23 illustrates an example of a process flow of the Physical Disk Address Control in the memory of FIG. 2.

FIG. 23 illustrates an example of a process flow of the Physical Disk Address Control 112-22-5 in the memory 112 of FIG. 2. The program starts at 112-2-5-1. In step 112-22-5-3, the program reads the RAID Group Management Table 112-11-1 to check the configuration of the RAID group. In step 112-22-5-4, the program calculates the physical address within the evenly-distributed algorithm. The program ends at 112-22-5-5.

Figure 24:
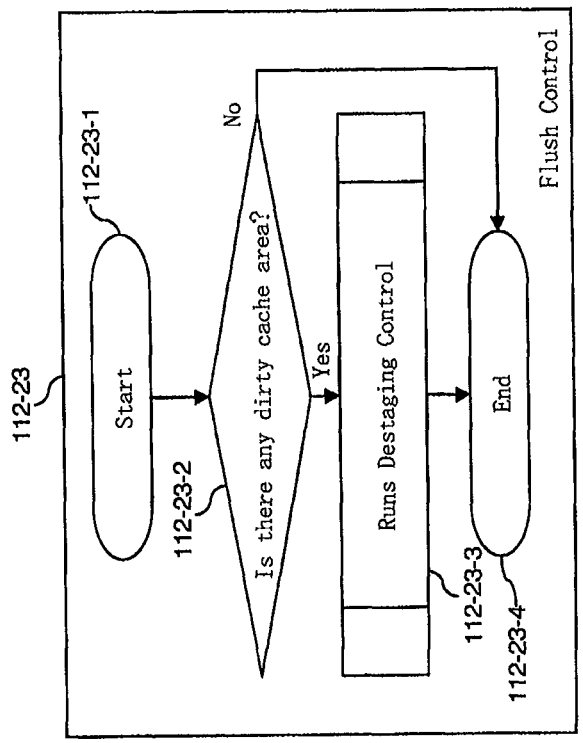
FIG. 24 illustrates an example of a process flow of the Flush Control in the memory of FIG. 2.

FIG. 24 illustrates an example of a process flow of the Flush Control 112-23 in the memory 112 of FIG. 2. The program starts at 112-23-1. In step 112-23-2, the program reads the "Dirty Queue" of the Cache Management Table 112-14. If dirty cache area is found, the program calls the Destaging Control 112-22-2 for the found dirty cache slot 112-30-1 in step 112-23-3. The program ends at 112-23-4.

Figure 25:
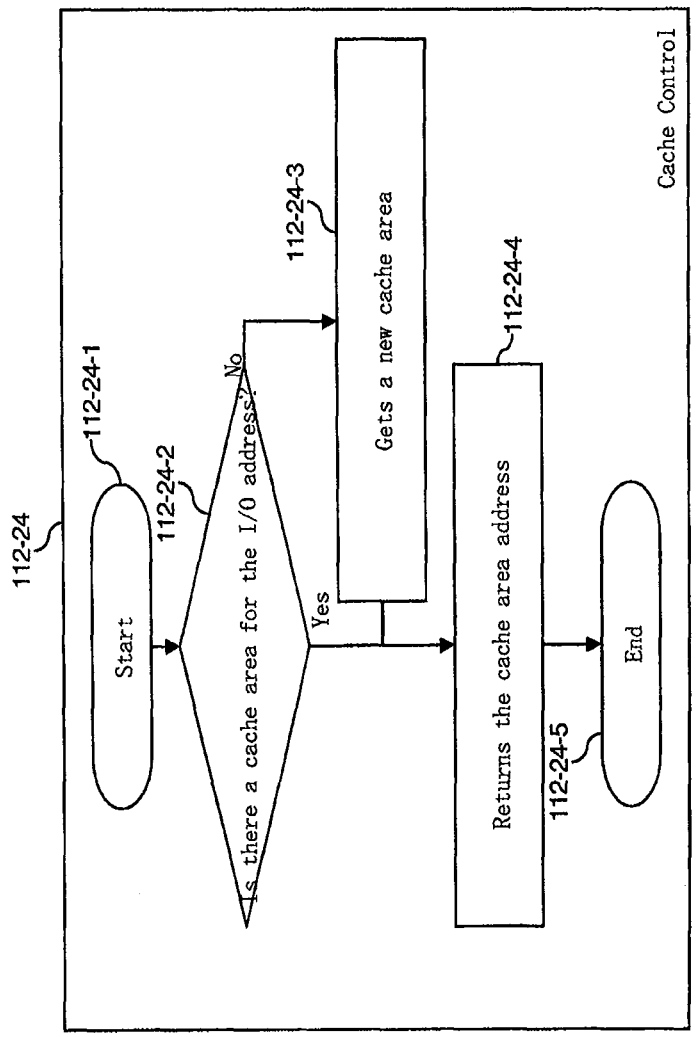
FIG. 25 illustrates an example of a process flow of the Cache Control in the memory of FIG. 2.

FIG. 25 illustrates an example of a process flow of the Cache Control 112-24 in the memory 112 of FIG. 2. The program starts at 112-24-1. In step 112-24-2, the program reads the Cache Management Table 112-14 and searches the address for the designated virtual volume slot 141-1 or capacity pool stripe 121-3. If there is no cache area for the I/O address, the program gets a new cache slot 112-30-1 for the designated address from the "Free" or "Clean" queue in step 112-24-3. In step 112-24-4, the program returns the address of the cache slot 112-30-1. The program ends at 112-24-5.

Figure 26:
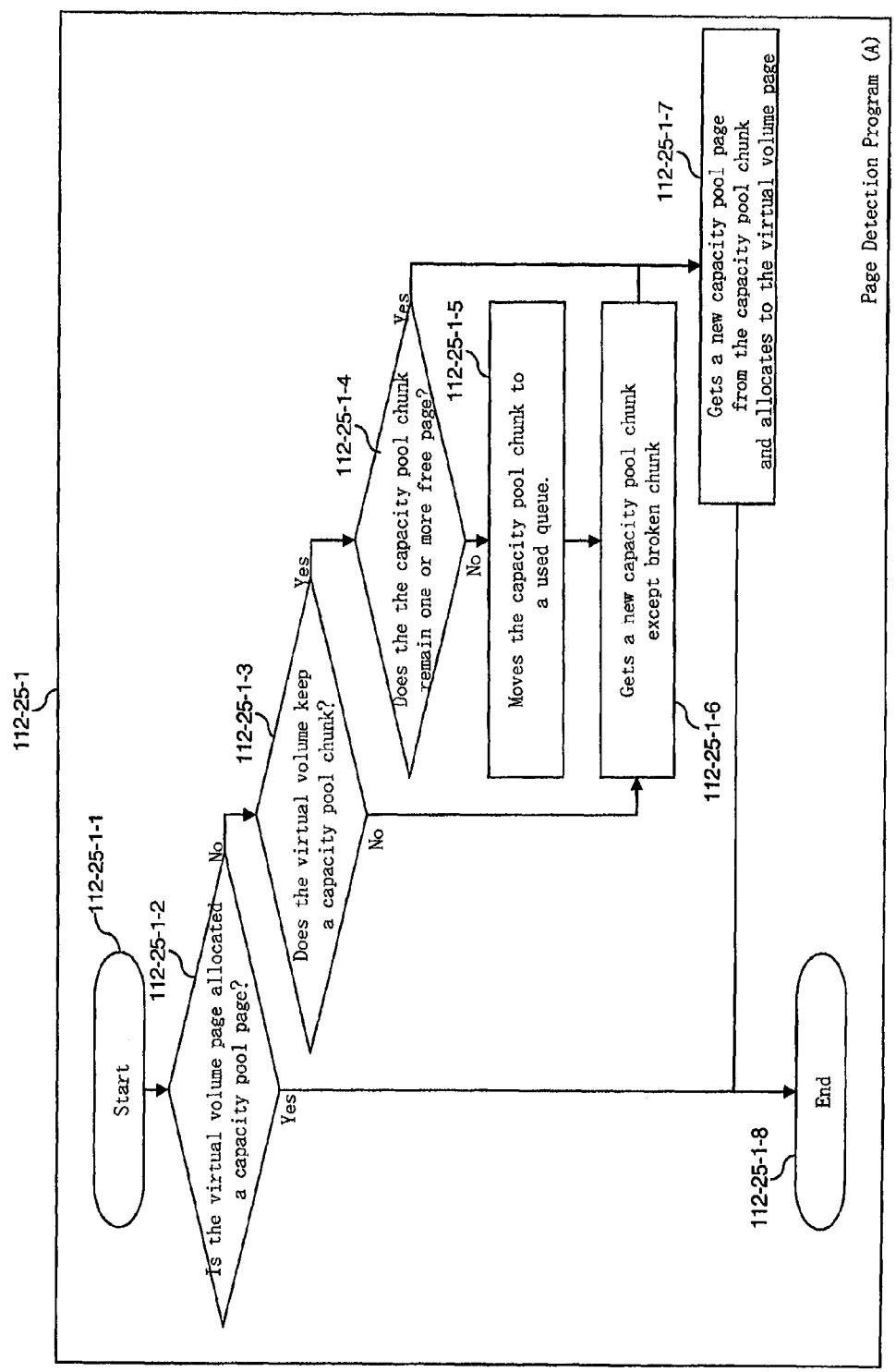
FIG. 26 illustrates an example of a process flow of the Page Detection Control (A) in the memory of FIG. 2.

FIG. 26 illustrates an example of a process flow of the Page Detection Control (A) 112-25-1 in the memory 112 of FIG. 2. The program starts at 112-25-1-1. In step 112-25-1-2, the program reads the Virtual Volume Page Management Table 112-15-1 and checks a RAID Group Number 112-15-1-2 and determines whether the Capacity Pool Page Index 112-15-1-3 stores the capacity pool page information or not (i.e., whether the virtual volume page 141-2 is allocated a capacity pool page 121-2). In step 112-25-1-3, the program reads the Virtual Volume Management Table 112-11-2 and checks a Using RAID Group Number 112-11-2-3 and determines whether the Using Capacity Pool Chunk Number 112-11-2-4 stores capacity pool chunk information or not (i.e., whether the virtual volume 114 keeps a capacity pool chunk 121-1). In step 112-25-1-4, the program reads the Capacity Pool Chunk Management Table 112-15-2 and checks to determine whether the Used Capacity 112-15-2-3 is less than the capacity pool chunk size (i.e., whether the capacity pool chunk 121-1 has one or more free pages 121-2). In step 112-25-1-5, the program changes the Using RAID Group Number 112-11-2-3 and the Using Capacity Pool Chunk Number 112-11-2-4 to remove the reference. It also changes the Previous Chunk Number 112-15-2-5 and Next Chunk Number 112-15-2-6 to enqueue to a used queue on the Used Chunk Queue Index 112-11-1-6, thereby moving the capacity pool chunk 121-1 to a used queue. In step 112-25-1-6, the program changes the Previous Chunk Number 112-15-2-5 and Next Chunk Number 112-15-2-6 to dequeue from a free queue on the Free Chunk Queue Index 112-11-1-5. It also changes the Using RAID Group Number 112-11-2-3 and Using Capacity Pool Chunk Number 112-11-2-4 to make reference, thereby getting a new capacity pool chunk except for the broken chunk. In step 112-25-1-7, the program stores the information of the Virtual Volume Page 141-2 to the Capacity Pool Page Management Table 112-15-3, and stores the information of the Capacity Pool Page 121-2 to the Virtual Volume Page Management Table 112-15-1, thereby allocating a new capacity pool page 121-2 from the capacity pool 121-1 chunk to the virtual volume page 141-2. In step 112-25-1-8, the program returns the Capacity Pool Page 121-2 address and ends.

Figure 27:
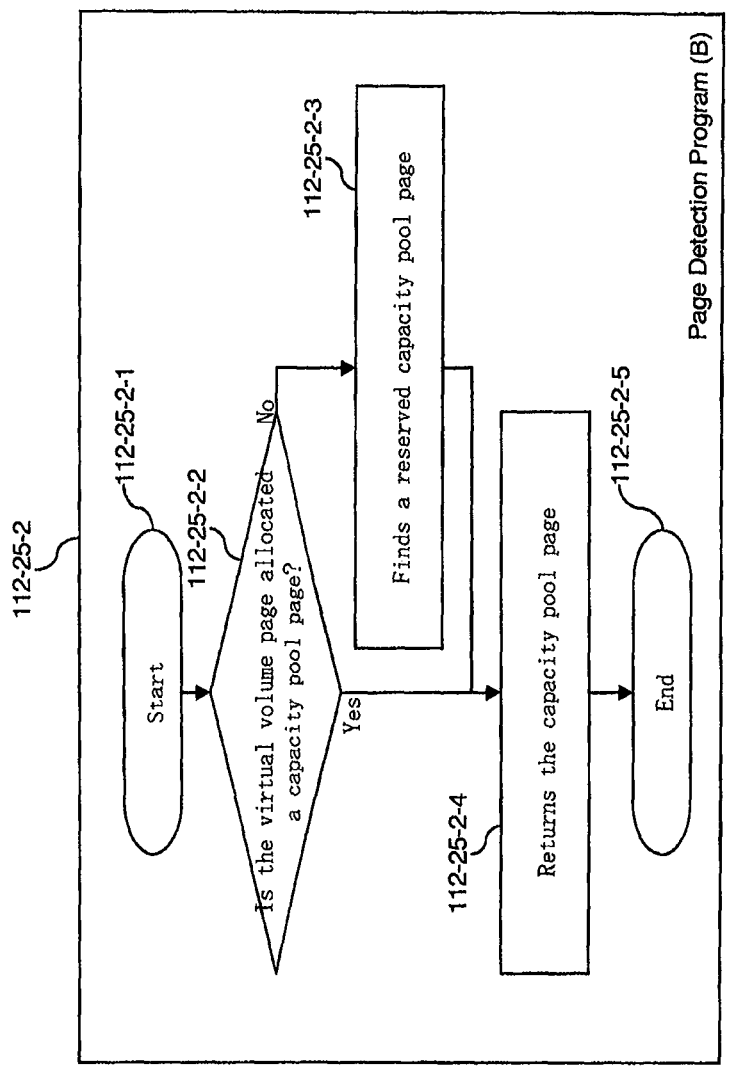
FIG. 27 illustrates an example of a process flow of the Page Detection Control (B) in the memory of FIG. 2.

FIG. 27 illustrates an example of a process flow of the Page Detection Control (B) 112-25-2 in the memory 112 of FIG. 2. The program starts at 112-25-2-1. In step 112-25-2-2, the program reads the Virtual Volume Page Management Table 112-15-1 and checks a RAID Group Number 112-15-1-2 and determine whether the Capacity Pool Page Index 112-15-1-3 stores capacity pool page information or not (i.e., whether the virtual volume page 141-2 is allocated a capacity pool page 121-2). In step 112-25-2-3, the program finds a reserved capacity pool page (that stores formatted data). In step 112-25-2-4, the program returns the address of the capacity pool page 121-2. The program ends at 112-25-2-5.

Figure 28:
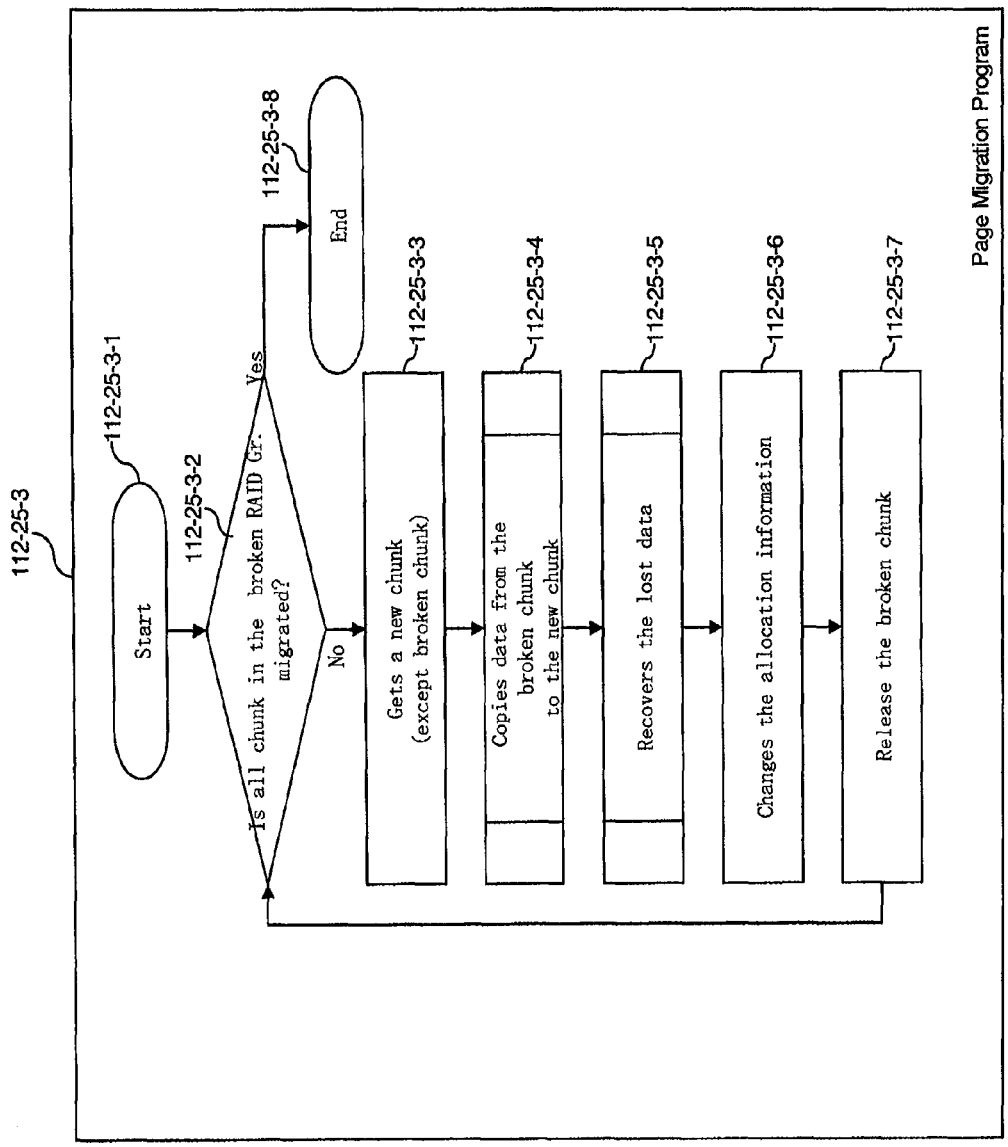
FIG. 28 illustrates an example of a process flow of the Page Migration Control in the memory of FIG. 2.

FIG. 28 illustrates an example of a process flow of the Page Migration Control 112-25-3 in the memory 112 of FIG. 2. The program starts at 112-25-3-1. In step 112-25-3-2, the program repeats this process until no page that belongs to the broken RAID Group remains (i.e., all chunks in the broken RAID group are migrated). In step 112-25-3-3, the program selects the RAID group except broken RAID group and changes the Previous Chunk Number 112-15-2-5 and Next Chunk Number 112-15-2-6 to dequeue from a free queue on the Free Chunk Queue Index 112-11-1-5. In step 112-25-3-4, the program calls the Copy Control 112-22-3 to copy the chunk data from the broken chunk to the new chunk. In step 112-25-3-5, the program calls the Parity Calculation Control 112-22-4 to generate or recover the lost data. In step 112-25-3-6, the program changes the Virtual Volume Page Management Table 112-15-1 to refer to the new page in the newly-allocated capacity pool chunk, thereby altering the allocation information. In step 112-25-3-7, the program changes the Using RAID Group Number 112-11-2-3 and Using Capacity Pool Chunk Number 112-11-2-4 to remove reference, and changes the Previous Chunk Number 112-15-2-5 and Next Chunk Number 112-15-2-6 to enqueue to a used queue on the Used Chunk Queue Index 112-11-1-6, thereby releasing the broken chunk. The program ends at 112-25-3-8.

Figure 29:
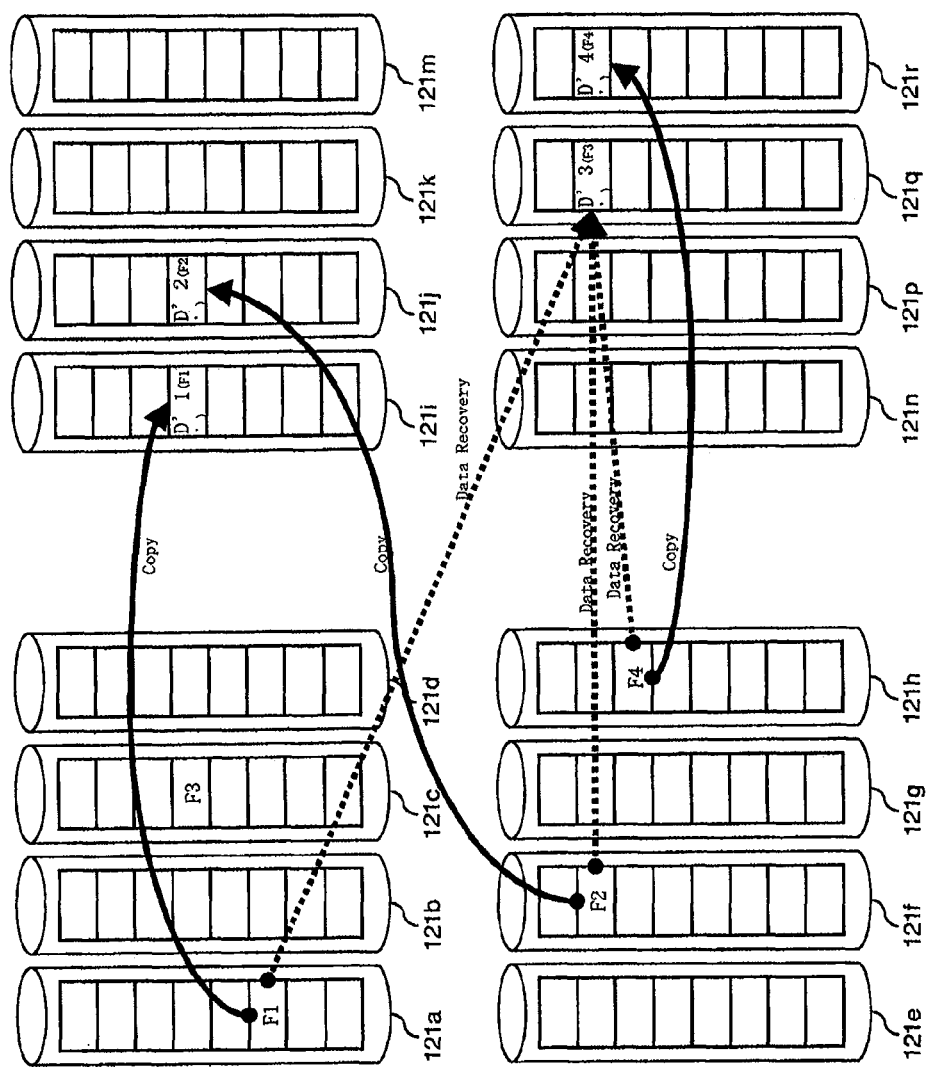
FIG. 29 illustrates an example of the data recovery by chunks and pages copy.
Figure 30:
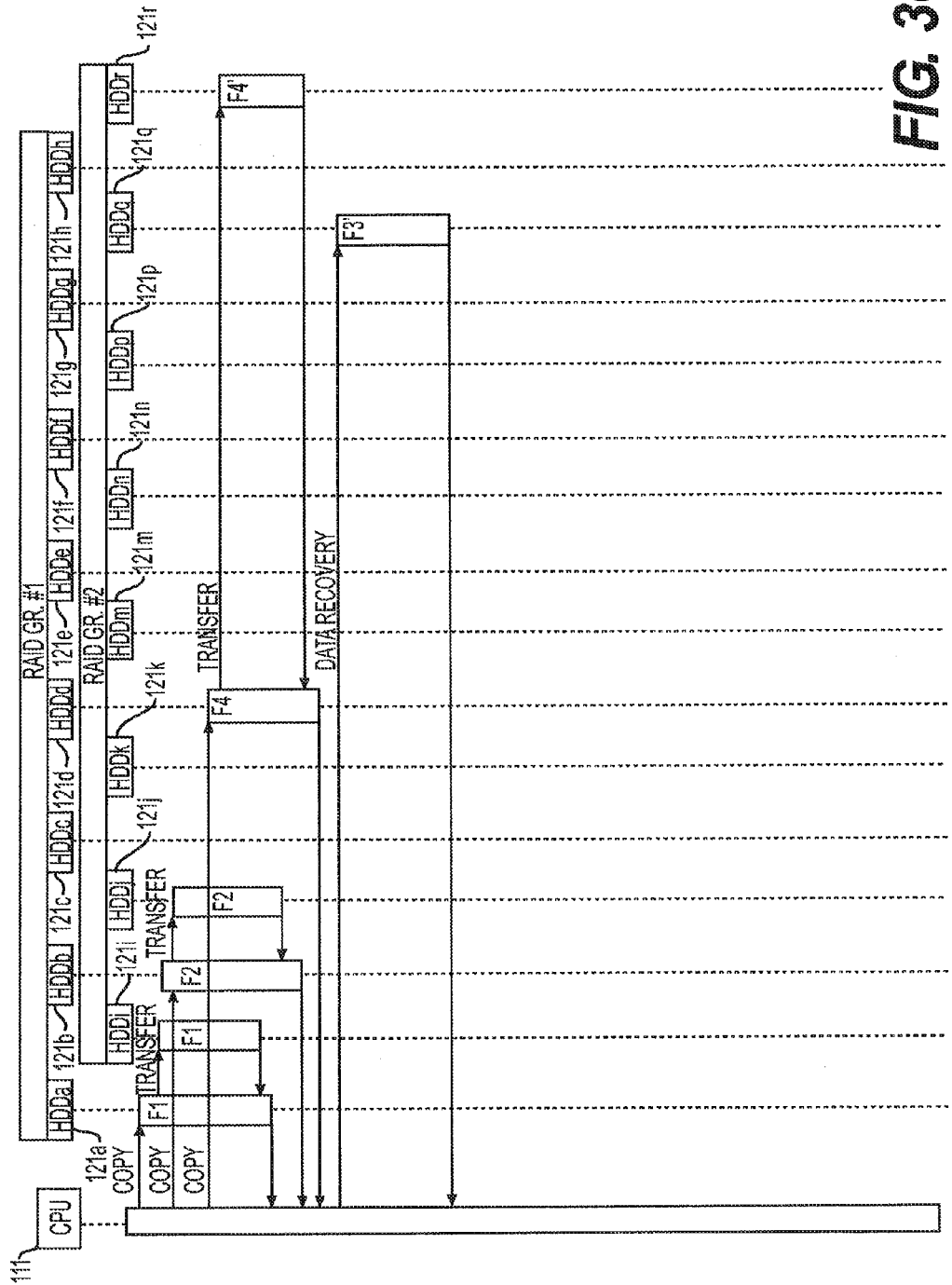
FIG. 30 illustrates the summary and sequence of the data recovery of FIG. 29.

FIG. 29 illustrates an example of the data recovery by chunks and pages copy. FIG. 29 shows two RAID groups. The first RAID group includes disks 121*a*, 121*b*, 121*c*, 121*d*, 121*e*, 121*f*, 121*g*, and 121*h*. The second RAID group includes disks 121*i*, 121*j*, 121*k*, 121*m*, 121*n*, 121*p*, 121*q*, and 121*r*. Failure of disk 121*c* occurs. A solid arrowed line means that an object refers by pointer, while a dashed arrowed line means that an object refers by calculation (more specifically, by parity calculation). The data recovery process searches a chunk (F1, F2, F3, F4) in the first RAID group using the failed disk 121*c*, and selects an unused chunk in the healthy second RAID group (D'1, D'2, D'3, D'4). The chunk data is then copied from the chunk (F1, F2, F3, F4) in the first RAID group to the second RAID group except from the failed disk 121*c* which has the chunk portion F3 (i.e., F1 in disk 121*a*, F2 in disk 121*f*, F4 in disk 121*h* copied as F1' in disk 121*i*, F2' in disk 121*j*, and F4' in disk 121*r*). As shown by the dashed arrowed lines, the data of the chunk portion F3 in the failed disk 121*c* is recovered from the other disks (F1 in disk 121*a*, F2 in disk 121*f*, F4 in disk 121*h*) by parity calculation to form chunk portion F3' in disk 121*q*. FIG. 30 illustrates the summary and sequence of the data recovery of FIG. 29.

Figure 31:
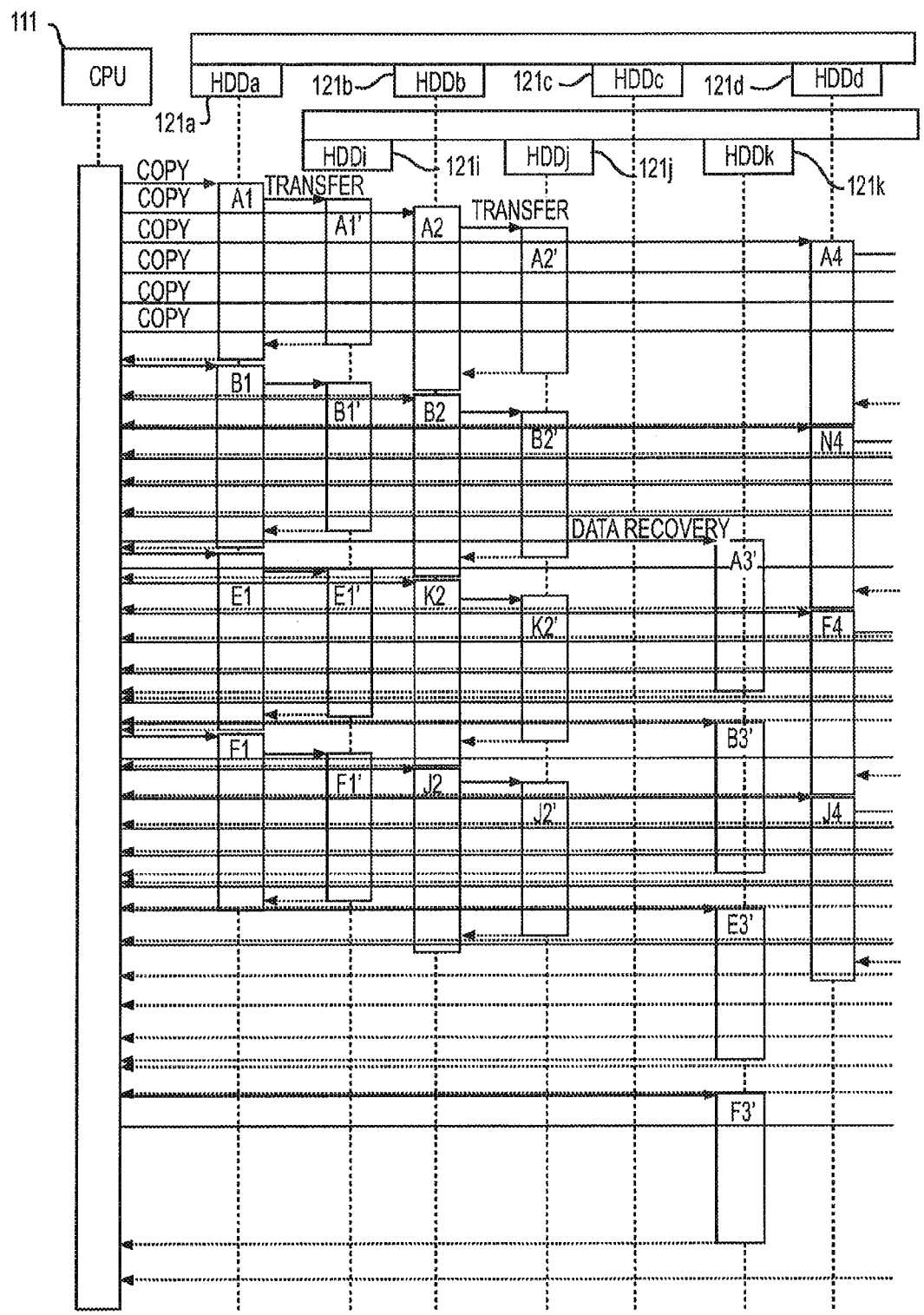
FIG. 31 illustrates an overall sequence of data recovery by chunks and pages copy.
Figure 31:
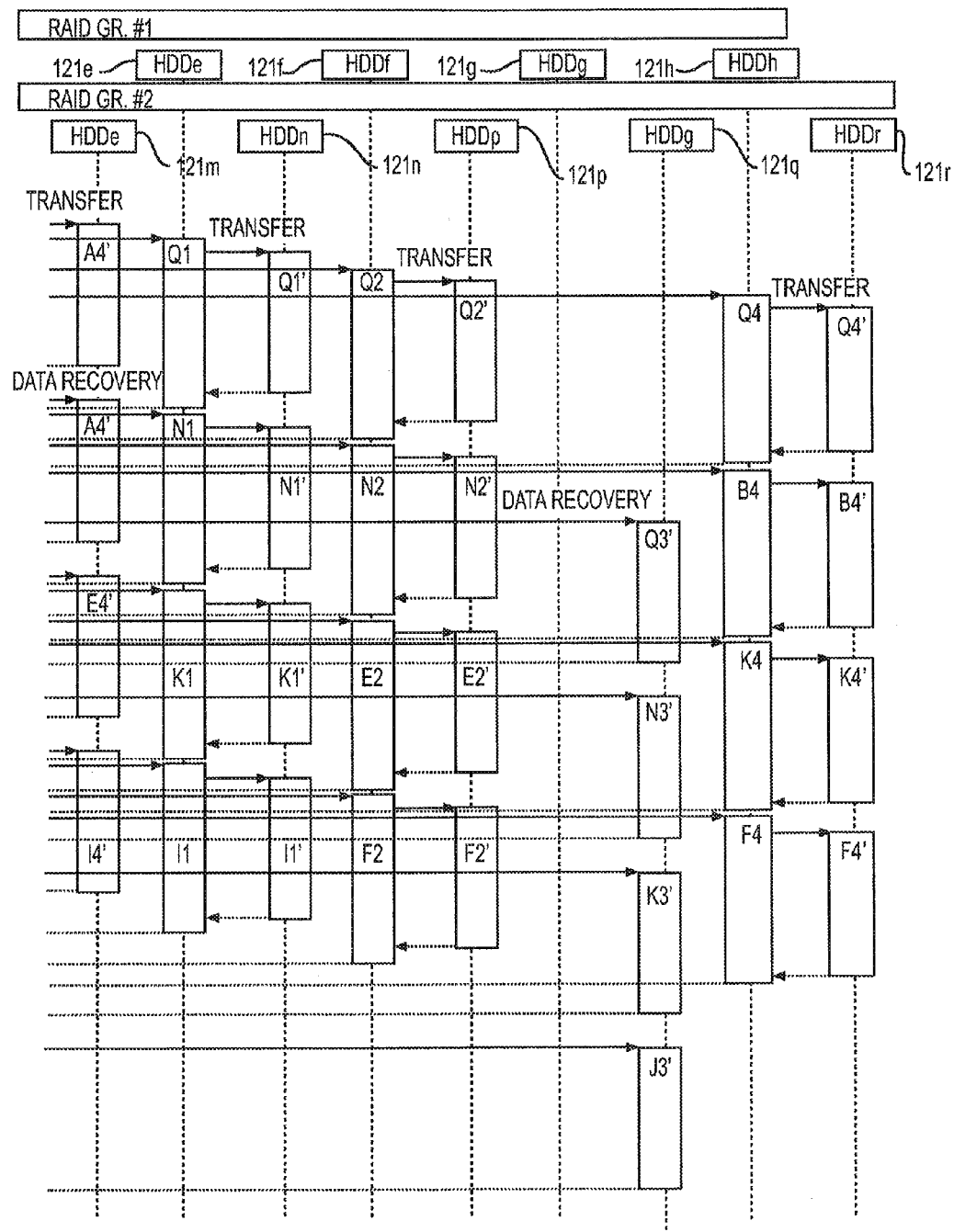

FIG. 31 illustrates an overall sequence of data recovery by chunks and pages copy. While FIGS. 29 and 30 show data recovery for one chunk, FIG. 31 shows data recovery for a plurality of chunks. By avoiding disk read/write collision, the data recovery scheme can optimize and parallelize the migration process.

In the example above, the number of hard disk drives in a group is a multiple of eight (M is 6 for the number of hard disk drives having data of a stripe and N is 2 for the number of hard disk drives having parity data of the stripe). In case of reading data from one of the stripes including a failure of one of the hard disk drives in the group, the storage controller is controlled to access only seven hard disk drives without access to the failed hard disk drive. The storage system includes a capacity pool volume having unallocated hard disk drives. The stripes are allocated from the capacity pool volume. The allocation of each stripe is conducted in response to receiving the data from another storage device.

Second Embodiment

Figure 32:
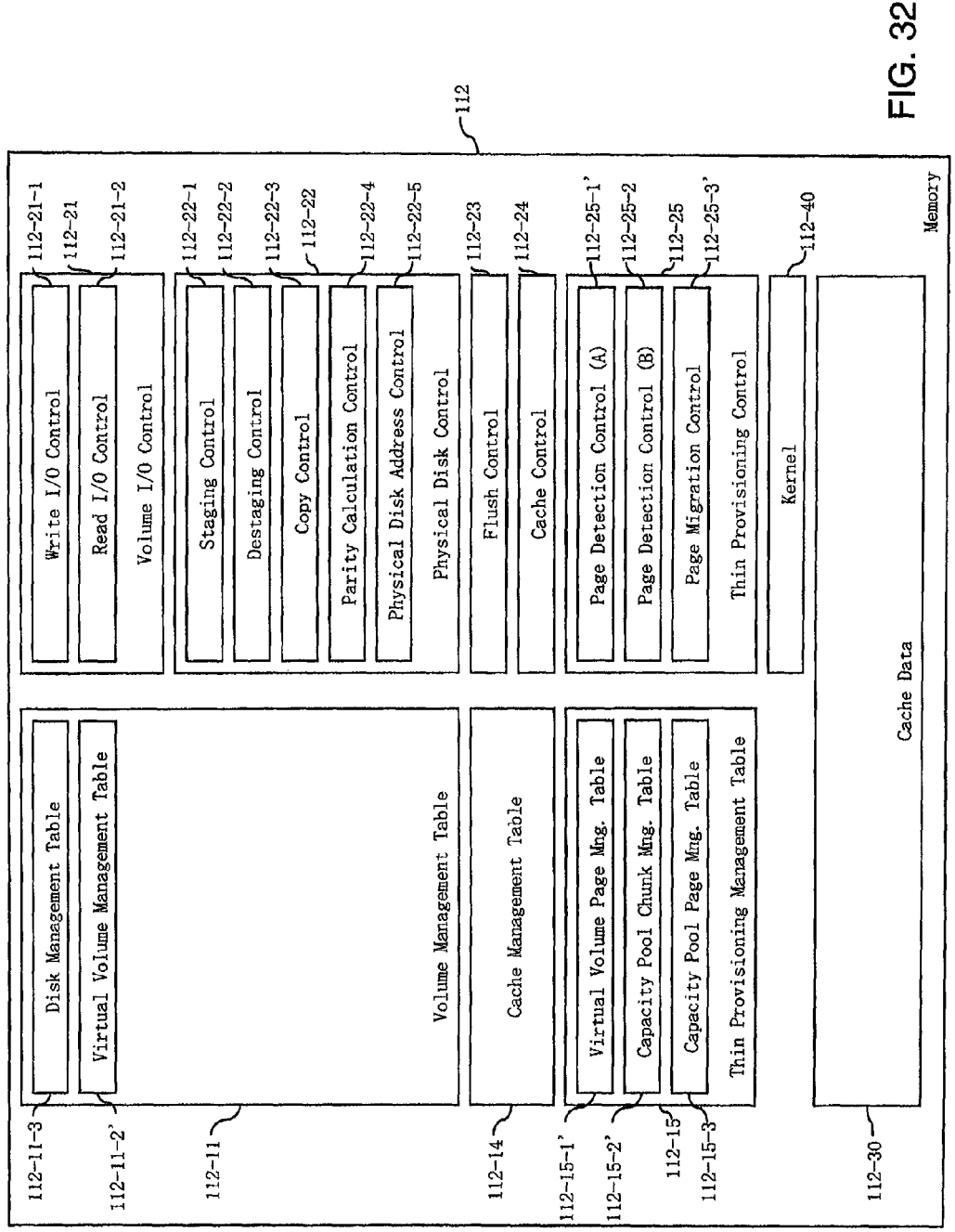
FIG. 32 illustrates an example of a memory in the storage subsystem of FIG. 1 according to a second embodiment of the invention.

FIG. 32 illustrates an example of a memory 112 in the storage subsystem 100 of FIG. 1 according to a second embodiment of the invention. Only changes from the first embodiment of FIG. 2 will be discussed. In FIG. 32, a Disk Management Table 112-11-3 (FIG. 33) is provided in place of RAID Group Management Table 112-11-1 of FIG. 2 for the physical structure management for the disks 121. FIG. 32 further shows alternative embodiments of the Virtual Volume Management Table 112-11-2' (FIG. 34) in place of 112-11-2, Virtual Volume Page Management 112-15-1' (FIG. 35) in place of 112-15-1, Capacity Pool Chunk Management Table 112-15-2' (FIG. 36) in place of 112-15-2, Page Detection Control 112-25-1' (FIG. 39) in place of 112-25-1, and Page Migration Control 112-25-3' (FIG. 40) in place of 112-25-3.

FIG. 33 illustrates an example of a Disk or HDD Management Table 112-11-3 in the memory 112 of FIG. 32. The Disk Management Table 112-11-3 includes columns of the Disk Number 112-11-3-1 representing the ID of the disks 121, Disk Capacity 112-11-3-4 representing the capacity of the disk 121, and Used Parcel Number 112-11-3-3 representing the list of used capacity pool parcels.

FIG. 34 illustrates an example of a Virtual Volume Management Table 112-11-2' in the memory 112 of FIG. 32. The Virtual Volume Management Table 112-11-2' includes the same two columns (as in 112-11-2 of FIG. 4 according to the first embodiment) of the Virtual Volume Number 112-11-2-1 representing the ID of the virtual volume, and Virtual Volume Capacity 112-11-2-2 representing the capacity of the virtual volume ("N/A" means the virtual volume doesn't exist). It further includes columns of the Disk Number 112-11-2'-3 representing the ID list of disks 121 that belong to a capacity pool chunk which the virtual volume currently uses, and Parcel Number 112-11-2'-4 representing the ID list of capacity pool parcels belong to a capacity pool chunk that the virtual volume currently uses.

FIG. 35 illustrates an example of a Virtual Volume Page Management Table 112-15-1' in the memory 112 of FIG. 32. The Virtual Volume Page Management Table 112-15-1' includes a column of the Virtual Volume Page Index 112-15-1-1 representing the top address of the virtual volume page, as in 112-15-1 of FIG. 5 according to the first embodiment. Unlike 112-15-1, the Virtual Volume Page Management Table 112-15-1' includes columns of the Disk Number 112-15-1'-2 representing the ID list of disks 121 belonging to a capacity pool page to which the virtual volume page refers, and Capacity Pool Page Index 112-15-1'-3 representing the ID list of addresses belonging to a capacity pool page to which the virtual volume page refers.

FIG. 36 illustrates an example of a Capacity Pool Chunk Management Table 112-15-2' in the memory 112 of in FIG. 32. As compared to the table 112-15-2 in the first embodiment of FIG. 6, the Capacity Pool Chunk Management Table 112-15-2' of FIG. 32 includes columns of Disk or HDD Number 112-15-2'-5 representing the ID list of disks 121 that make up the capacity pool chunk 121-1, and Parcel Number 112-15-2'-6 representing the ID list of capacity pool parcels 121-4 that make up the capacity pool chunk.

Figure 37:
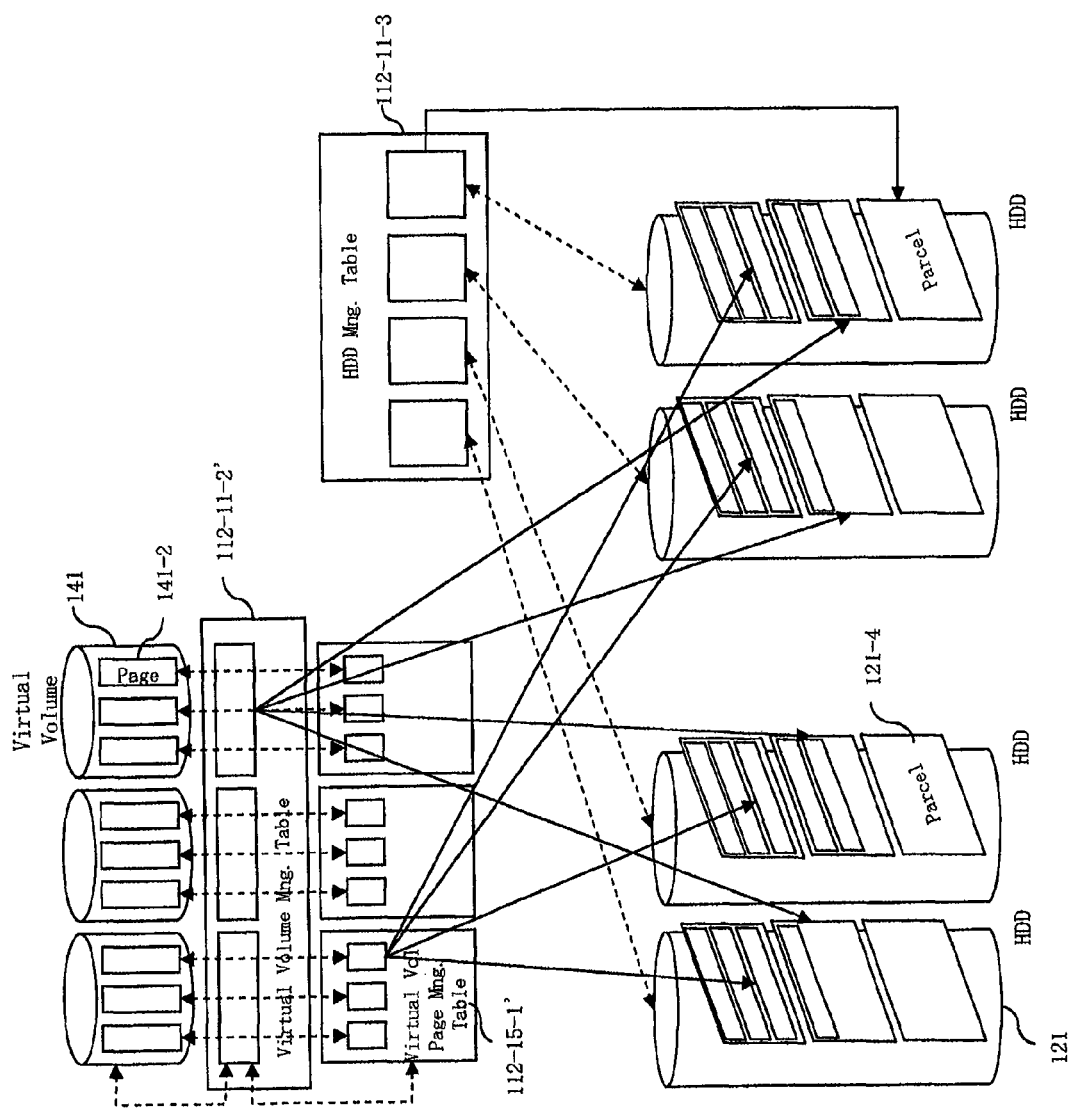
FIG. 37 illustrates an example of a virtual volume and its Virtual Volume Management Table and Virtual Volume Page Management Table.

FIG. 37 illustrates an example of a virtual volume 141 and its Virtual Volume Management Table 112-11-2' and Virtual Volume Page Management Table 112-15-1'. A solid arrowed line means that an object refers by pointer (from the Virtual Volume Management Table 112-11-2' and Virtual Volume Page Management Table 112-15-1' to the capacity pool parcel 121-4 and capacity pool stripes 121-3), while a dashed arrowed line means that an object refers by calculation (among the virtual volume 141 and the management tables 112-11-2 and 112-15-1 and between the Disk Management Table 112-11-3 and the disks 121). The virtual volume 141 and the Virtual Volume Management Table 112-11-2' are on a one-to-one relation. The Virtual Volume Management Table 112-11-2' shows capacity using the current capacity pool parcels 121-4. The virtual volume page 141-2 and the Virtual Volume Page Management Table 112-15-1' are on a one-to-one relation. The Virtual Volume Page Management Table 112-15-1' refers to slices of the capacity pool page 121-2, if a page is allocated.

Figure 38:
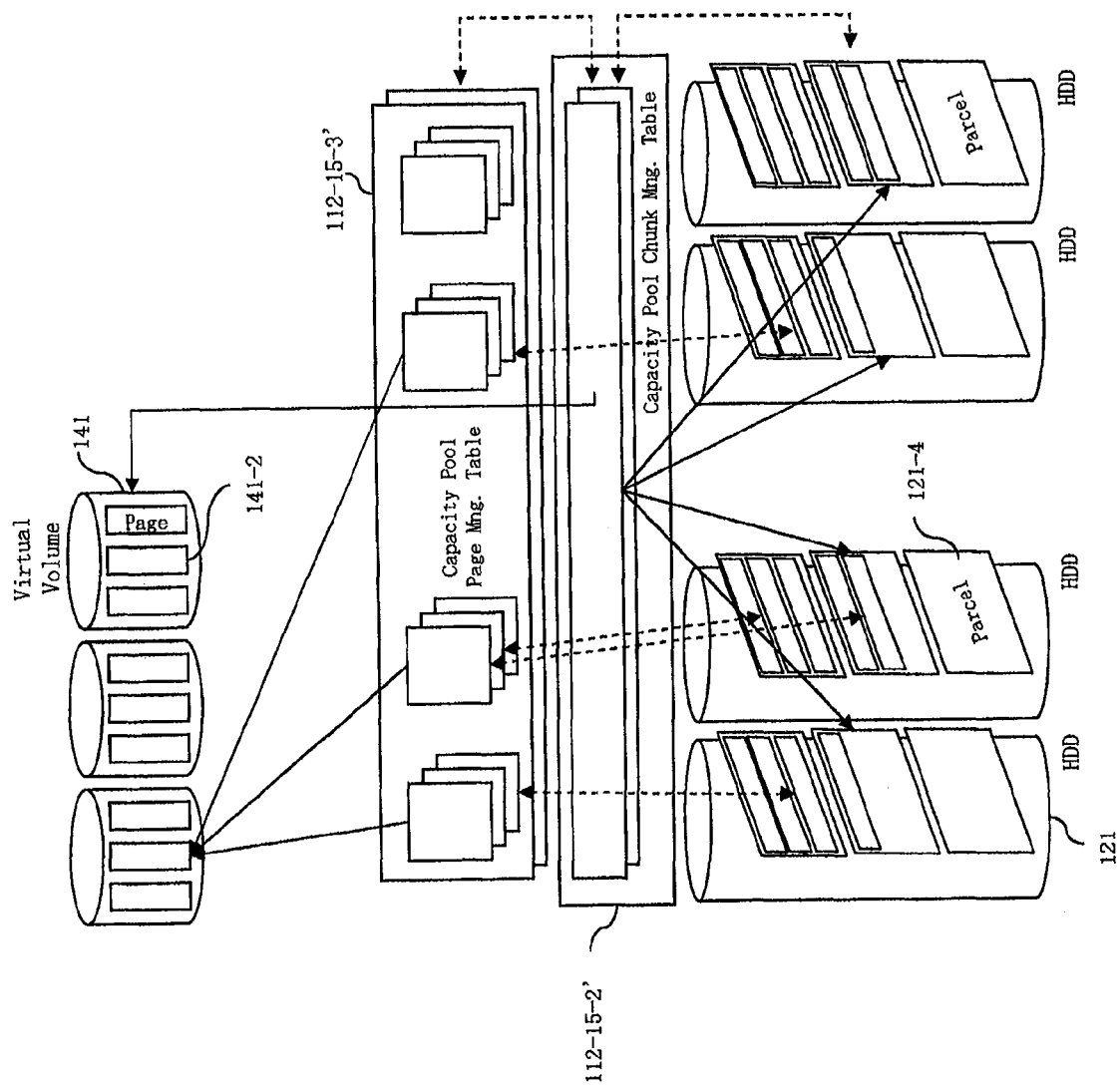
FIG. 38 illustrates an example of the table reference structure toward capacity pool in the virtual volume of FIG. 37.

FIG. 38 illustrates an example of the table reference structure toward capacity pool in the virtual volume 141 of FIG. 37. A solid arrowed line means that an object refers by pointer (from the Capacity Pool Chunk Management Table 112-15-2' to the capacity pool parcels 121-4). A dashed arrowed line means that an object refers by calculation (among the Capacity Pool Page Management Table 112-15-3', Capacity Pool Chunk Management Table 112-15-2', disks 121, and capacity pool stripes 121-3. The disks 121 and Disk Management Table 112-11-3 are on a one-to-one relation. The Disk Management Table 112-11-3 refers to used and unused Capacity Pool Parcels 112-4. The Capacity Pool Parcel 121-4 and Capacity Pool Chunk Management Table 112-15-2' are on a one-to-one relation. The Capacity Pool Chunk Management Table 112-15-2' refers to the Virtual Volume 141. The Capacity Pool Page Management Table 112-15-3' and Capacity Pool Parcel 121-4 are on a one-to-many relation. The Capacity Pool Page Management Table 112-15-3' refers to Virtual Volume Page 141-2.

Figure 39:
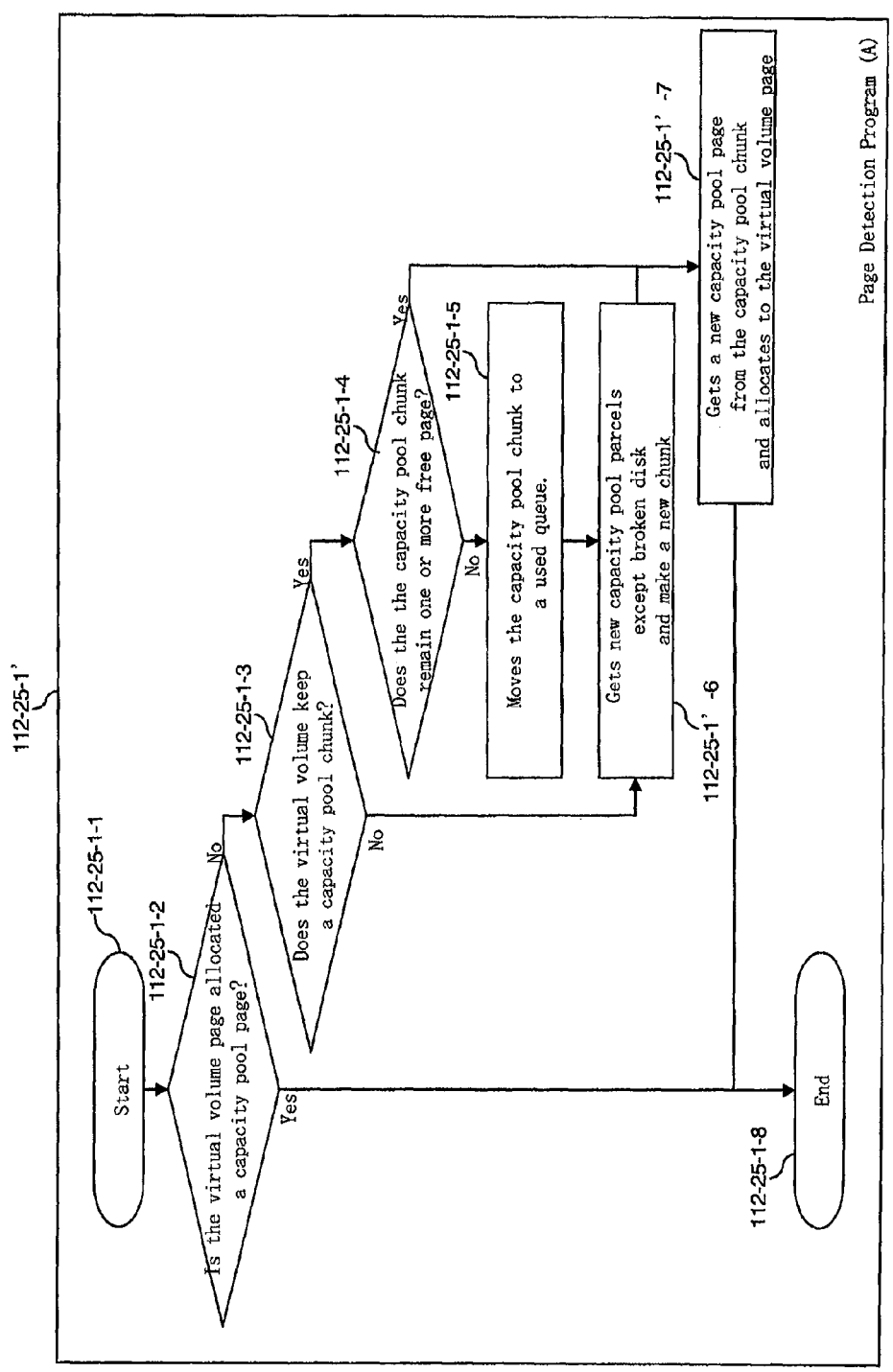
FIG. 39 illustrates an example of a process flow of the Page Detection Control (A) in the memory of FIG. 32.

FIG. 39 illustrates an example of a process flow of the Page Detection Control (A) 112-25-1' in the memory 112 of FIG. 32. The program performs the same steps as 112-25-1 in the first embodiment of FIG. 26, except for steps 112-25-1'-6 (replacing 112-25-1-6) and 112-25-1'-7 (replacing 112-25-1-7). In step 112-25-1'-6, the program adds the Used Parcel Number 112-11-3-3 and gets the new Capacity Pool Chunk Management row, and changes the Disk Number 112-11-2'-3 and Capacity Pool Parcel Number 112-11-2'-4 to make reference. In step 112-25-1'-7, the program stores the information of the Virtual Volume Page 141-2 to the Capacity Pool Page Management Table 112-15-3', and stores slice of Capacity Pool Parcels 121-4 information to the Virtual Volume Page Management Table 112-15-1', thereby allocating the new capacity pool page to the virtual volume page.

Figure 40:
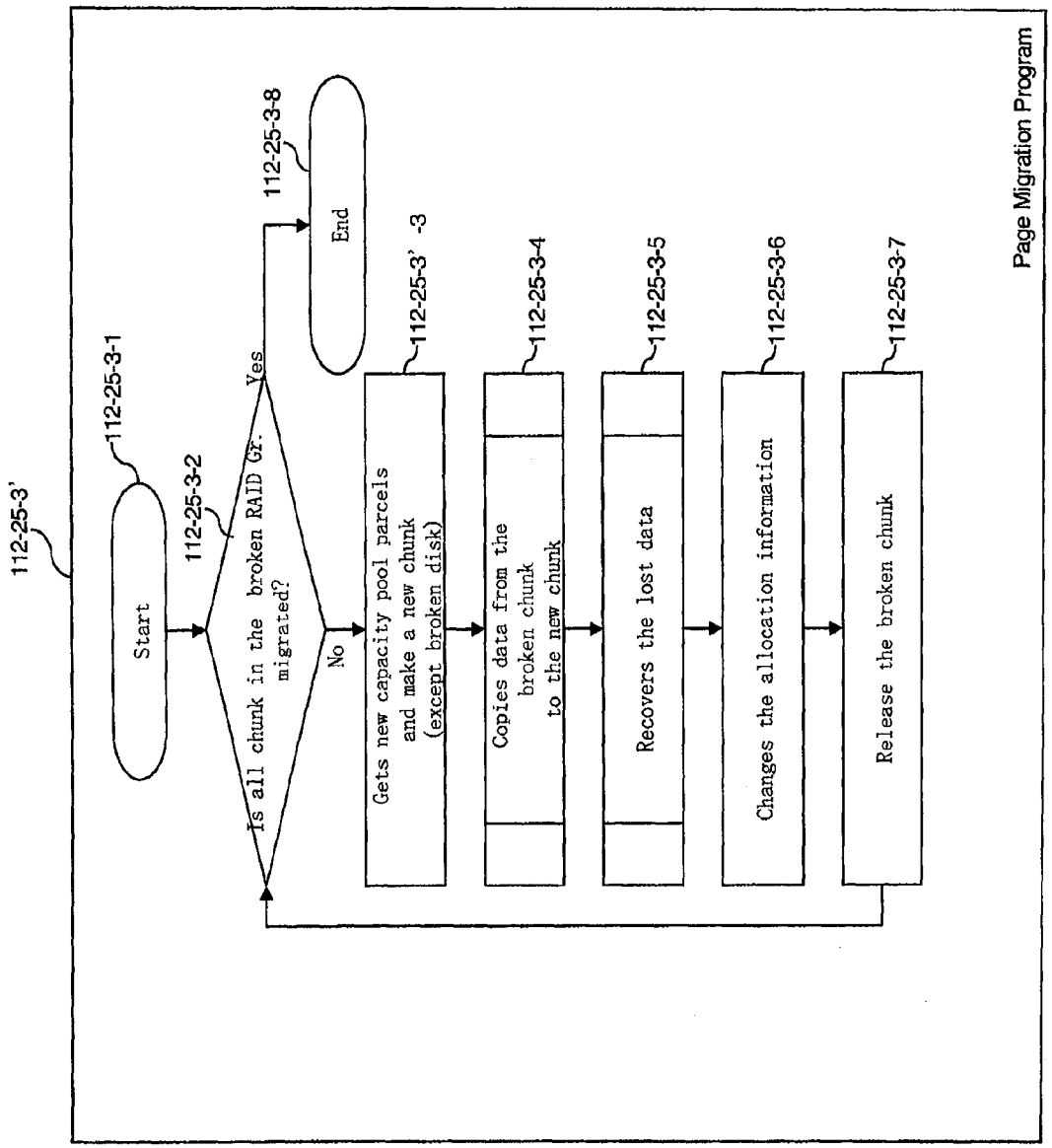
FIG. 40 illustrates an example of a process flow of the Page Migration Control in the memory of FIG. 32.

FIG. 40 illustrates an example of a process flow of the Page Migration Control 112-25-3' in the memory 112 of FIG. 32. The program performs the same steps as 112-25-3 in the first embodiment of FIG. 28, except for step 112-25-3'-3 (replacing step 112-25-3-3). In step 112-25-3'-3, the program selects the disks 121 except broken disk and adds the Used Parcel Number 112-11-3-3 and gets a new Capacity Pool Chunk Management row.

From the foregoing, it will be apparent that the invention provides methods, apparatuses and programs stored on computer readable media for fast data recovery from storage device failure such as HDD failure. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a plurality of drives configuring a first RAID group and a second RAID group;
   a controller being configured to:
   store first M data and first N parity data into first M+N parcels of first M+N drives included in the first RAID group, and second M data and second N parity data into second M+N parcels of second M+N drives included in the first RAID group, where the M and N are integers,
   wherein one of the drives in the first RAID group stores one of the first M+N parcels and one of the second M+N parcels, and another one of the drives in the first RAID group stores one of the first M+N parcels or one of the second M+N parcels; and
   for a failure that has occurred on one of the first M+N drives, recover one of the first M+N parcels which is stored in the failed one of the first M+N drives by utilizing other first M+N parcels, and copy the recovered one of the first M+N parcels and the other first M+N parcels to M+N parcels of M+N drives included in the second RAID group.

2. The storage system according to claim 1,
   wherein the first M data and first N parity data configure a plurality of first stripes, and the second M data and the second N parity data configure a plurality of second stripes.

3. The storage system according to claim 1,
   wherein the first N parity data is distributed across the first M+N drives, and the second N parity data is distributed across the second M+N drives.

4. The storage system according to claim 1,
   wherein the controller is further configured to provide a virtual volume to which one or more pages are allocated from a capacity pool after receiving a write request, the capacity pool being configured by the first RAID group and the second RAID group; and
   wherein a plurality of pages are created on the first M+N parcels and second M+N parcels.

5. The storage system according to claim 1,
   wherein the controller is further configured to provide a virtual volume to which one or more pages are allocated from a capacity pool after receiving a write request, the capacity pool being configured by the first RAID group and the second RAID group; and
   wherein a first chunk includes a plurality of first pages corresponding to the first M+N parcels, and a second chunk includes a plurality of second pages corresponding to the second M+N parcels.

6. The storage system according to claim 1,
   wherein one of the drives in the second RAID group stores one of the M+N parcels and one of another M+N parcels, and another one of the drives in the second RAID group stores one of the M+N parcels or one of the another M+N parcels.

7. The storage system according to claim 1,
   wherein the plurality of drives are connected to a plurality of interfaces; and
   wherein each of the first M+N drives is connected to a different interface of the plurality of interfaces, respectively.

8. A storage management method for a storage system, wherein the storage system has a plurality of drives configuring a first RAID group and a second RAID group, and has a controller, the method comprising:
   storing first M data and first N parity data into first M+N parcels of first M+N drives included in the first RAID group, and second M data and second N parity data into second M+N parcels of second M+N drives included in the first RAID group, where the M and N are integers,
   wherein one of the drives in the first RAID group stores one of the first M+N parcels and one of the second M+N parcels, and another one of the drives in the first RAID group stores one of the first M+N parcels or one of the second M+N parcels; and
   for a failure that has occurred on one of the first M+N drives, recovering one of the first M+N parcels which is stored in the failed one of the first M+N drives by utilizing other first M+N parcels, and copy the recovered one of the first M+N parcels and the other first M+N parcels to M+N parcels of M+N drives included in the second RAID group.

9. The storage management method according to claim 8,
   wherein the first M data and first N parity data configure a plurality of first stripes, and the second M data and the second N parity data configure a plurality of second stripes.

10. The storage management method according to claim 8,
    wherein the first N parity data is distributed across the first M+N drives, and the second N parity data is distributed across the second M+N drives.

11. The storage management method according to claim 8, further comprising:
    providing a virtual volume to which one or more pages are allocated from a capacity pool after receiving a write request, the capacity pool being configured by the first RAID group and the second RAID group; and
    creating a plurality of pages on the first M+N parcels and second M+N parcels.

12. The storage management method according to claim 8, further comprising:
    providing a virtual volume to which one or more pages are allocated from a capacity pool after receiving a write request, the capacity pool being configured by the first RAID group and the second RAID group;
    wherein a first chunk includes a plurality of first pages corresponding to the first M+N parcels, and a second chunk includes a plurality of second pages corresponding to the second M+N parcels.

13. The storage management method according to claim 8,
    wherein one of the drives in the second RAID group stores one of the M+N parcels and one of another M+N parcels, and another one of the drives in the second RAID group stores one of the M+N parcels or one of the another M+N parcels.

14. The storage management method according to claim 8,
    wherein the plurality of drives are connected to a plurality of interfaces; and
    wherein each of the first M+N drives is connected to a different interface of the plurality of interfaces, respectively.

* * * * *